United States Patent
Neidich et al.

(10) Patent No.: US 8,898,824 B2
(45) Date of Patent: Dec. 2, 2014

(54) METHOD OF MANUFACTURING A SIDE DOOR FOR A WALK-IN TUB

(75) Inventors: Andre J. Neidich, Southlake, TX (US); Addiel Sital, Keller, TX (US); William Langley Peck, II, Arlington, TX (US)

(73) Assignee: Safety Tubs Company, LLC, Piscataway, NJ (US)

( * ) Notice: Subject to any disclaimer, the term of this patent is extended or adjusted under 35 U.S.C. 154(b) by 11 days.

(21) Appl. No.: 13/150,504

(22) Filed: Jun. 1, 2011

(65) Prior Publication Data
US 2012/0304376 A1 Dec. 6, 2012

(51) Int. Cl.
  *A47K 3/02* (2006.01)
  *B29C 43/00* (2006.01)
  *A47K 3/00* (2006.01)

(52) U.S. Cl.
  CPC .............. *B29C 43/003* (2013.01); *A47K 3/006* (2013.01)
  USPC ........................................................... 4/555

(58) Field of Classification Search
  USPC ........ 4/555, 538, 540, 556; 49/381, 400, 394, 49/457, 467, 473–473, 475.1; 29/447, 29/446, 434; 264/522, 553, 547
  See application file for complete search history.

(56) References Cited

U.S. PATENT DOCUMENTS

| | | |
|---|---|---|
| 2,847,177 A | 8/1958 | Ronan |
| 2,991,482 A | 7/1961 | Brass |
| 3,066,316 A | 12/1962 | Russell |
| 3,371,354 A | 3/1968 | Hayslett |
| 3,435,466 A | 4/1969 | Cheney |
| 2,896,899 A | 7/1969 | Ronan |
| 3,582,388 A | 6/1971 | Stayner |
| 3,863,275 A | 2/1975 | Brendgord et al. |
| 4,080,710 A | 3/1978 | Hess |
| 4,158,585 A * | 6/1979 | Wright ............................ 156/94 |

(Continued)

FOREIGN PATENT DOCUMENTS

| | | |
|---|---|---|
| GB | 1 220 710 | 1/1971 |
| GB | 2439311 A | 12/2007 |

(Continued)

OTHER PUBLICATIONS

Brochure, Kitchen/Bath Industry Show & Conference, Apr. 30-May 3, 2009 (34 pages).

(Continued)

*Primary Examiner* — Lori Baker
(74) *Attorney, Agent, or Firm* — Flaster/Greenberg P.C.

(57) ABSTRACT

The present invention provides a method for manufacturing a door for a walk-in bathtub, which comprises forming a tub door cap from an acrylic sheet, wherein the tub door cap has an outer shape defining a door for a walk-in tub; forming a channel into a surface of the tub door cap along a peripheral area thereof; forming a threshold portion configured to mate with the channel in the tub door cap and extend outwardly from the tub door cap; and the tub door cap is then adhered to the threshold portion of the door to form a walk-in tub door. The acrylic sheet that forms the tub door cap may be cast acrylic or it may be reinforced by co-extruding with thermoplastic, adding a reinforcing filler and/or fiberglass. A walk-in bathtub door made by the method described above and a walk-in bathtub assembly having a door made by the method described above are also provided herein.

11 Claims, 28 Drawing Sheets

(56) References Cited

U.S. PATENT DOCUMENTS

| | | |
|---|---|---|
| 4,542,545 A | 9/1985 | Johnson et al. |
| 4,680,817 A | 7/1987 | Sloan et al. |
| 4,802,247 A | 2/1989 | Leichle et al. |
| 5,074,770 A | 12/1991 | Graefe |
| 5,129,804 A | 7/1992 | Perantoni et al. |
| 5,184,358 A | 2/1993 | Gruidel et al. |
| 5,351,345 A | 10/1994 | Sills et al. |
| 5,676,901 A | 10/1997 | Higashi et al. |
| 5,701,614 A | 12/1997 | Appleford et al. |
| 5,813,062 A | 9/1998 | Vago et al. |
| 5,924,147 A | 7/1999 | Clark et al. |
| 6,113,839 A | 9/2000 | McAllister |
| 6,321,494 B1 | 11/2001 | Oberg |
| 6,381,769 B1 * | 5/2002 | Lofquist, Jr. .................... 4/555 |
| 7,237,276 B2 | 7/2007 | Longman |
| 7,237,279 B1 | 7/2007 | Berke et al. |
| 7,299,509 B1 | 11/2007 | Neidich |
| 7,788,783 B2 | 9/2010 | Neidich |
| 2005/0102746 A1 | 5/2005 | Wright et al. |
| 2008/0040849 A1 | 2/2008 | Brandenstein |
| 2008/0109954 A1 | 5/2008 | Neidich |
| 2008/0178380 A1 * | 7/2008 | Rydalch .......................... 4/555 |
| 2010/0037382 A1 | 2/2010 | Spiker et al. |
| 2010/0156120 A1 * | 6/2010 | Luo ................................ 292/139 |
| 2010/0263119 A1 | 10/2010 | Neidich et al. |

FOREIGN PATENT DOCUMENTS

| | | |
|---|---|---|
| JP | 06-198660 A | 7/1994 |
| JP | 2002-067137 A | 3/2002 |
| JP | 2008-062501 A | 4/2008 |
| KR | 200722050 B1 | 8/2007 |
| WO | WO81/02387 | 9/1981 |
| WO | WO84/04236 | 11/1984 |
| WO | WO00/35324 | 6/2000 |
| WO | WO2010/074771 A1 | 7/2010 |

OTHER PUBLICATIONS

Picture of Booth, Kitchen/Bath Industry Show & Conference, Apr. 30-May 3, 2009 (1 page).
Script/Talking Points, Kitchen/Bath Industry Show & Conference, Apr. 30-May 3, 2009 (1 page).
Tri-Fold Display, Mar. 2009 (2 pages).
Pricing Guide, Safety Tubs Product List, Apr. 15, 2009 (6 pages).
International Search Report From counterpart International Application No. PCT/2011/062885, 9 pages, Dec. 10, 2012.

* cited by examiner

TOP VIEW

TOP VIEW

METHOD OF MANUFACTURING A SIDE DOOR FOR A WALK-IN TUB

BACKGROUND OF THE INVENTION

1. Field of the Invention

The present invention relates generally to the manufacture of walk-in bathtubs and associated tub doors, more specifically to a method for manufacturing a walk-in tub side door preferably formed of acrylic.

2. Description of Related Art

Walk-in bathtubs comprise high tub walls with a high built-in seat and a side door, allowing the user to walk into the tub from the side and sit down without having to climb down into a low bath tub. FIG. 1 shows a typical example of a walk-in bathtub in accordance with the prior art. Walk-in tubs are particularly suited for individuals who have physical limitations that make it difficult or dangerous to climb into and out of a regular, low bathtub or to stand up in a shower for extended periods of time. Such limitations might include physical disabilities or simply the reduced strength, balance and range of motion that typically occur with advancing age. Walk-in tubs are not only easier to enter and exit than conventional bathtubs, they also reduce the risk of a slip and fall in comparison with conventional tubs and showers.

In addition to safety, the ease of entering the tub via the side walk-in door also provides users with independence, allowing them to bathe without the assistance of another person when getting into and out of the tub.

Acrylic is the preferred material for conventional bathtub manufacturers. Acrylic is germ- and stain-resistant, has good heat-retaining qualities and is durable. Because acrylic is non-porous, mildew and algae cannot stick to it. It wipes clean with common household non-abrasive cleaners. Even grease, oil, hair dye and cosmetics that would stain other materials can be easily removed with rubbing alcohol.

However, because of their depth, walk-in bathtubs are typically made from gel-coated fiberglass, which does not offer the advantages of acrylic materials in terms of heat retention, stain resistance and strength. The reason for using fiberglass in manufacturing walk-in tubs lies in the technical difficulties encountered when forming the deep basin of the tub with a single sheet of acrylic. With seat heights approaching seventeen inches above the tub floor, acrylic has a tendency to tear during the vacuum forming process or become excessively thin at the bottom, compromising its ability to hold the requisite water weight.

Walk-in tub doors are critical to a positive walk-in tub experience. Most such doors open inwardly so that they are pressure sealed by the weight of water against the door when the door is filled, although various latch mechanisms are also provided. The ease with which such doors operate varies with their design, hinge mechanism and fit to the opening in the walk-in tub having a threshold area over which a user enters the tub. A smooth and sealingly engaged fit to the walk-in tub threshold as well as a door that is economical to manufacture are desirable in the art.

U.S. Pat. No. 7,788,783 teaches a method of manufacturing walk-in tubs and associated doors. The walk-in tub door is manufactured from two main pieces. A threshold piece is first vacuum formed and trimmed to fit a door opening in the side of a tub. A flat panel is then formed so that a peripheral edge of the flat panel mates with the peripheral edge of the trimmed threshold piece. The flat panel is then bonded to the threshold piece to form the tub door. A tub door is also described in U.S. Pat. No. 7,299,509 having a frame and extruded two-piece construction and also having two tracks for a gasket and hinge, respectively.

U.S. Patent Publication No. 2010/0263119 A1 teaches an improved hinge for opening and closing a walk-in bathtub door having a double axis hinge allowing the door to open in a way that provides more clearance than standard prior art one-axis hinged doors.

A need still exists for an improved method of forming a walk-in bathtub door that is economical and provides a smooth appearance and a reinforced structure.

BRIEF SUMMARY OF THE INVENTION

Included within the invention is a method for making a walk-in bathtub tub door, comprising: (a) forming a tub door cap from an acrylic sheet, wherein the tub door cap has an outer shape defining a door for a walk-in tub; (b) forming a channel into a surface of the tub door cap along a peripheral area thereof; (c) forming a threshold portion configured so as to have a peripheral edge that mates with the channel in the tub door cap and to extend outwardly in a thickness direction from the tub door cap; and (d) adhering the tub door cap to the threshold portion of the door to form a walk-in tub door. In the method, the tub door cap is adhered to the threshold portion of the door using putty adhesive.

The method may also include adhering the tub door cap to the threshold portion of the door using putty adhesive. The acrylic sheet may be formed of cast acrylic.

Step (a) of the method may also include reinforcing the acrylic sheet by co-extruding the acrylic sheet with a thermoplastic; adding a reinforcing filler; and/or adding fiberglass and forming a tub door cap from the reinforced acrylic sheet.

If co-extrusion is used, the thermoplastic may be acrylonitrile-butadiene-styrene.

If fiberglass is added, the acrylic sheet may be reinforced by a fiberglass spray.

Step (a) in the method may also further comprise forming a tub door cap from a reinforced acrylic sheet by casting.

The invention also includes a walk-in bathtub door made according to the method noted above, and a walk-in bathtub assembly comprising a walk-in bathtub having an opening for receiving a bathtub door and a walk-in bathtub door attached to the walk-in bathtub via a hinge, wherein the bathtub door is formed according to the method noted above.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
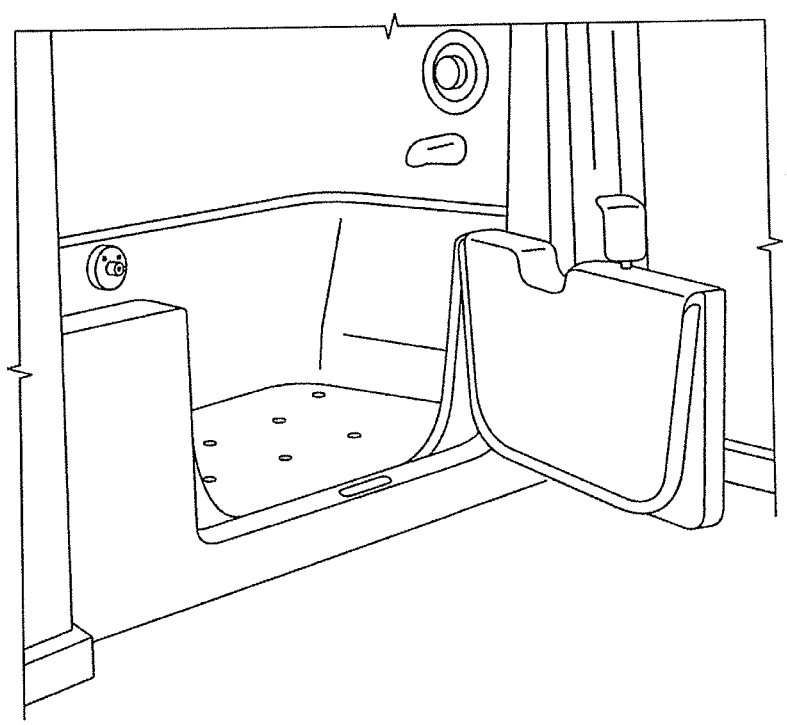
FIG. 1 shows a typical example of a walk-in bathtub in accordance with the prior art.

As noted in U.S. Pat. No. 7,788,783, incorporated by reference herein, an acrylic walk-in bathtub may be made by methods described therein. Other suitable methods for making a bathtub for use with a door manufactured according to the present invention are also acceptable. The method of the '783 patent is preferred. Such a method involves heating an acrylic sheet, wherein the outer perimeter of the sheet is heated to a higher temperature, preferably about 370° F., than the center of the sheet, preferably about 310° F. to about 312° F. The heated acrylic sheet is then placed over a vacuum mold, wherein the mold is shaped like a bathtub, including a seat and a foot well. The vacuum draws the heated acrylic sheet into the mold. Vacuum pressure is manually reduced when the acrylic reaches the top of the seat in the mold. The vacuum is shut off when the acrylic is approximately two inches from the bottom of the foot well of the mold.

In one embodiment of the method of making a tub, an acrylic sheet is heated, wherein an outer portion of the acrylic sheet is heated to a temperature which is higher than a temperature of an inner portion of the acrylic sheet; (b) placing the heated acrylic sheet over a vacuum mold, wherein a mold in the vacuum mold is shaped like a bathtub, and the bathtub comprises a seat and a foot well; (c) drawing the heated acrylic sheet into the vacuum mold using the vacuum, wherein vacuum pressure in the vacuum mold is reduced when the acrylic sheet reaches a top of the seat in the mold, and wherein vacuum pressure is shut off before the acrylic sheet reaches a bottom of the foot well of the mold; (d) cooling the acrylic to form a molded bathtub and removing the molded bathtub from the mold; and (e) securing the molded bathtub to a support frame, wherein the molded bathtub on the support frame has a door space in one side of the molded tub, and wherein the door space allows a person to step into the foot well of the tub from the side of the bathtub. Doors formed according to the present invention may be mounted within such a door space.

In the method of making a bathtub noted above, the method may also include forming the door space in the finished bathtub by cutting the door space into the wall in the bathtub. Pre-hung door assemblies made according to the present invention would then be installed in such a door space, wherein the door assembly may include a door formed from the method mounted onto a frame.

In the method of making the bathtub, the temperature of the outer portion of the acrylic sheet in step (a) may be about 320° F. to about 420° F., preferably about 360° F. to about 380° F., and the temperature of the inner portion of the acrylic sheet is about 200° F. to about 370° F., and preferably about 260° F. to about 320° F. Most preferably the temperature of the outer portion of the acrylic sheet is about 370° F. and the temperature of the inner portion of the acrylic sheet is about 310° F. Further, a temperature differential between the temperature of the outer portion of the acrylic sheet and the inner portion of the acrylic sheet is preferably about 40° F. to about 220° F., preferably about 40° F. to about 120° F., and more preferably about 50° F. to about 120° F. The temperature differential is most preferably about 60° F.

Step (c) may include spraying the mold with a mold release agent before drawing the acrylic sheet into the mold with the vacuum. The vacuum is preferably shut off in step (c) when the acrylic sheet is about two inches from the bottom of the foot well of the mold.

In step (e) the method for making the bathtub may further comprise attaching an acrylic apron to a side of the bathtub, wherein the apron has a cut-out door section with a threshold that fills a gap between the apron and the door space in the molded bathtub.

In step (c) the method for making the bathtub may include pulling part of the acrylic sheet over an outside surface of a side of the mold thereby forming a side apron that is integral with the bathtub. Step (d) may further include reinforcing an underside of the molded bathtub with fiberglass. The underside of the seat and the foot well may be reinforced with panels secured to the underside by fiberglass. Such panels may comprise wood or foam.

The mold may further include a well for forming a threshold and a door space integrally with the bathtub, wherein the threshold is at a bottom of the door space.

The tub manufacturing method may include a mold for forming a walk-in bathtub using vacuum foaming, wherein the mold is configured to form a bathtub having a foot well, a seat and an external well extending from a side of the bathtub for forming a threshold and door space integrally in the bathtub.

A method for manufacturing a walk-in bathtub to be used with a door made according to the invention may also include the steps of (a) heating an acrylic sheet, wherein an outer portion of the acrylic sheet is heated to a temperature which is higher than a temperature of an inner portion of the acrylic sheet; (b) placing the heated acrylic sheet over a vacuum mold, wherein a mold in the vacuum mold is shaped like a bathtub, and the bathtub comprises a seat, a foot well and a threshold forming portion; (c) drawing the heated acrylic sheet into the vacuum mold using the vacuum, wherein vacuum pressure in the vacuum mold is reduced when the acrylic sheet reaches a top of the seat in the mold, and wherein vacuum pressure is shut off before the acrylic sheet reaches a bottom of the foot well of the mold; (d) cooling the acrylic to form a molded bathtub and removing the molded bathtub from the mold; (e) removing flashing to form a finished bathtub and securing the finished molded bathtub to a support frame, wherein the finished molded bathtub on the support frame has a door space in one side of the molded tub having a threshold formed at a bottom thereof, and wherein the door space allows a person to step into the foot well of the tub from the side of the bathtub.

Acrylic sheet used in the methods noted above or for forming a walk-in tub door according to the present invention is commonly manufactured by one of three techniques. Each technique offers unique benefits, from cost and physical properties to variety of color and finish. Depending on the fabricator's needs, one type may be more appropriate than another. Understanding the manufacturing processes and differences between the end products is instrumental in choosing the proper material for a given application.

Extrusion is a continuous production method of manufacturing acrylic sheet. In the extrusion process, pellets of resins are fed into an extruder which heats them until they are a molten mass. This mass is then forced through a die as a molten sheet, which is then fed to calendar rolls, the spacing of which determine the thickness of the sheet and in some cases the surface finish. The continuous band of sheet may then be cut or trimmed into its final size.

The final product of extrusion exhibits much closer thickness tolerances than cast sheet. Because of the volume at which extruded sheet is produced, it is generally the most economical form available. It is available in a fair selection of colors, finishes and sizes.

Extruded acrylic sheet is prone to shrinking along the extruded line and expansion across it. This is of particular note if the acrylic is used for thermoforming. Extruded material also has a tendency to gum during fabrication if the cutting is too fast (linear feed rate) because it has a lower molecular weight. It also may absorb fast drying solvent cements faster than cast or continuous cast material. This can result in joint failures and incomplete gluing. To remedy this, slower drying cements and tooling designed for cutting extruded acrylic are generally used.

Continuous casting is an alternative method of mass producing acrylic sheet. This process involves pouring partially polymerized acrylic (somewhat less viscous than "Karo" syrup) between two highly polished stainless steel belts. The belts are separated by a space equal to the thickness of the sheet and the syrup is retained by gaskets at the edge of the belts. The belts move through a series of cooling and heating units to regulate the curing and are cut on the fly to size at the end of the production line.

One advantage of this process is partial polymerization of the material prior to casting. Some of the heat of polymerization (heat which is evolved as the liquid monomer is converted to a solid resin) is removed before the "syrup" is fed to the belt system. This contributes to the control of the continuous process.

Material costs favor continuous casting over extruded sheet manufacturing, as the cost of monomer is much less than that of polymer pellets. However, the production cost per unit of product is less for extrusion. Which process is more economical depends on the capacity and utility of the facilities as well as the cost of materials and equipment. In terms of competitive pricing between continuous cast and extruded acrylic, there are approximately a dozen extruders of acrylic sheet and only two continuous cast manufacturers in the U.S. This will have obvious effects on competitive pricing. Continuous cast acrylic offers good optical clarity, more uniform thickness and limited shrinkage during thermoforming.

A third method of manufacturing acrylic sheet is called cell casting. Cell casting historically has been carried out using one of three processes. The first process is the water bath technique in which acrylic syrup is poured into a mold typically constructed from two tempered glass sheets separated to produce the desired thickness of the sheet and sealed with a gasket at the edge. The mold is then submerged in a bath which maintains/controls a curing temperature and efficiently removes the heat generated in the process when the monomer is converted to polymer (note: monomer is not used in cell casting). The viscosity of acrylic monomer must be raised somewhat to avoid leakage of the molds or cells.

The second casting technique is the original process which involves placing the molds containing syrup into a circulating air oven in which air at a controlled temperature passes at a moderately high velocity over the surface of the mold.

The third method, developed by the Poly-Cast® Company, is an advancement over the water bath process and involves the use of a piece of equipment similar to a plate and frame filter press. Sections which serve as the mold for the sheet are alternated with sections through which water at a regulated temperature is circulated to promote the polymerization and cure of the sheet.

Cell cast products are subjected to a post-cure or annealing process. The sheet, as taken from the oven, bath or casting machine, will usually have "high" residual monomer content. The polymerization process is not complete. Post-curing reduces the residual monomer content and serves to ensure that no bubbling of the sheet occurs if the sheet is heated for thermoforming.

When casting a sheet from syrup, a change in density (specific gravity) of the ingredients occurs. Shrinkage of about 20% is typically experienced. In the cell casting process, most shrinkage occurs in thickness. The surface of the mold (tempered glass sheet) restrains the plastic sheet from shrinkage in terms of length and width. The annealing, in which the sheet is heated to its softening point, allows the sheet to relax or shrink, removing residual stress.

Cell cast products provide optical clarity, greater surface hardness and machine cleanly. They are offered in many colors, finishes and thicknesses. However, they do have greater thickness variation, making them less desirable for fitting into extrusions or thermoforming where uniform wall thickness must be maintained.

The preferred embodiment of the present invention utilizes continuous casting for forming acrylic sheets. However, any of the acrylic sheet manufacturing methods described above can be used to provide the acrylic sheet for use in making a walk-in bathtub or for use in the method of making a walk-in tub door according to the present invention.

Thermoforming (or vacuum forming) is a process in which a flat thermoplastic sheet is heated and deformed into the desired shape. The process is widely used in packaging consumer products and fabricating large items such as bathtubs, contoured skylights, and internal door liners for refrigerators.

As the name implies, thermoforming comprises two main steps: 1) heating and 2) forming. Heating is usually accomplished by radiant electric heaters, located on one or both sides of the starting plastic sheet at a distance of roughly 125 mm (5 in.). The duration of the heating cycle needed to sufficiently soften the sheet depends on the polymer, its thickness and color.

Figure 2A:
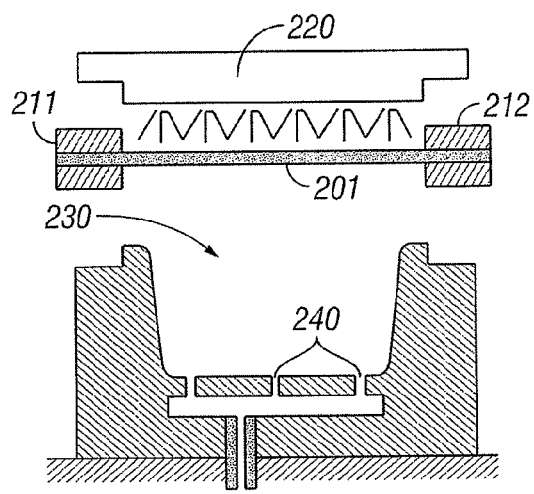
FIGS. 2A-2D illustrate the general process of vacuum thermoforming which may be used with the present invention.

FIGS. 2A-2D illustrate the general process of vacuum thermoforming which may be used with the present invention. Developed in the 1950's, vacuum thermoforming (also called vacuum forming) uses negative pressure to draw a preheated sheet into a mold cavity. FIG. 2A illustrates the first step, in which a flat acrylic sheet is softened by heating. The sheet 201, held by clamps 211, 212 is placed in close proximity to a radiant heater 220.

Figure 2B:
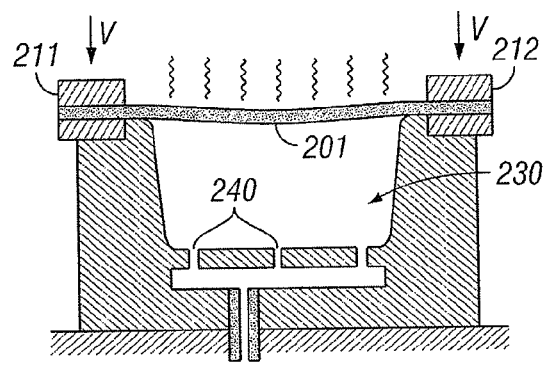
Figure 2C:
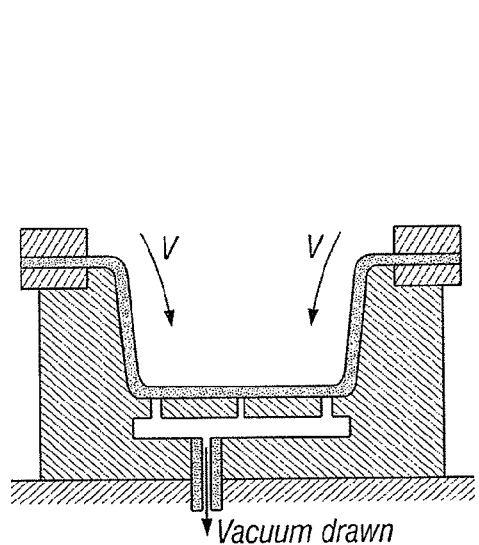

In FIG. 2B, the softened sheet 201 is placed over a concave mold cavity 230. As shown in FIG. 2C, a vacuum created through vacuum holes 240 draws the sheet 201 into the mold cavity 230. In most applications, the holes for drawing the vacuum in the mold are on the order of 0.8 mm (0.031 in.) in diameter, so their effect on the plastic surface is minor.

Figure 2D:
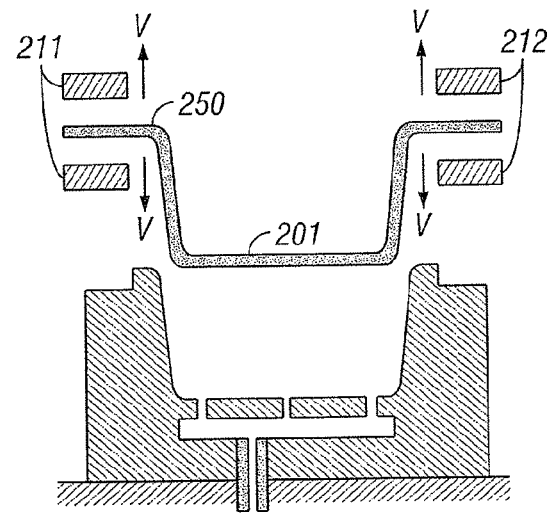

FIG. 2D shows the molded part 201' being removed from the mold after the plastic has hardened from contact with the cold mold surface. After the molded part 201' is removed from the clamps 211, 212, it is trimmed from the web 250, which is the residual plastic that was held within the clamps 211, 212 but is not part of the final mold design.

Figure 3:
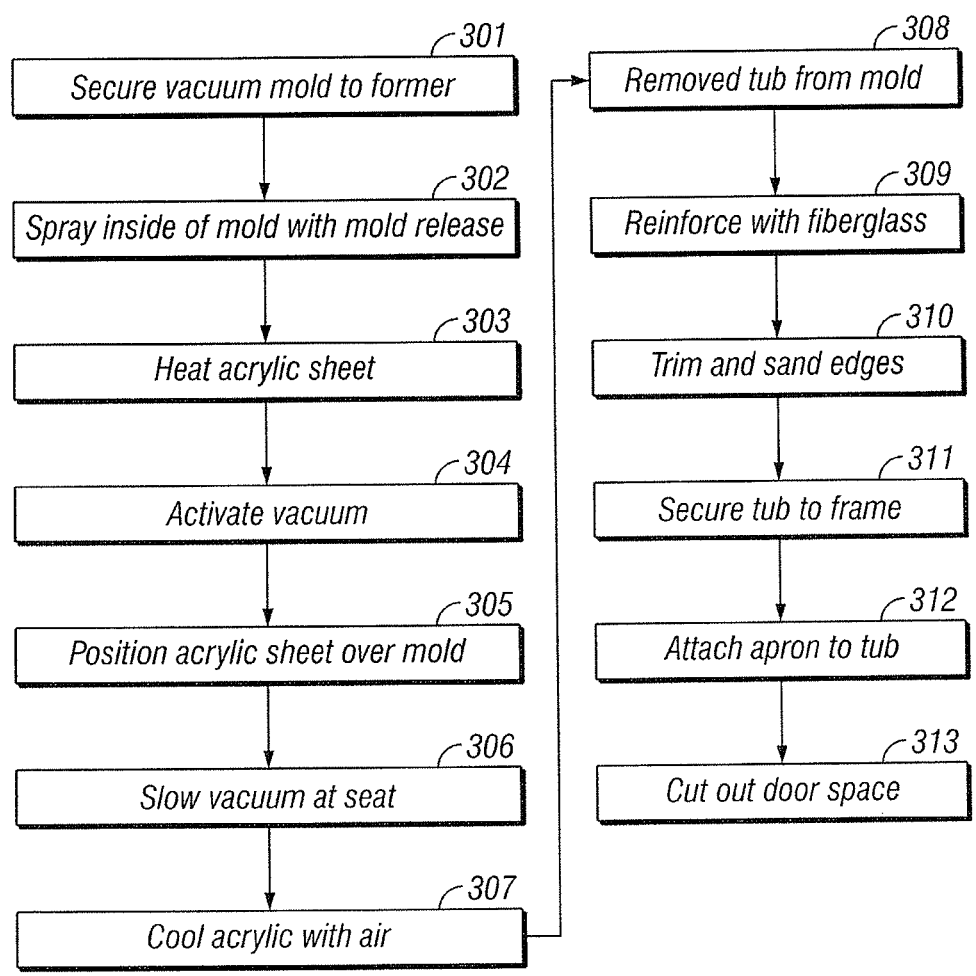
FIG. 3 is a flowchart illustrating the process of forming a walk-in bathtub in accordance with one preferred embodiment of the present invention.

FIG. 3 is a flowchart illustrating the process of forming a walk-in bathtub for use with a door formed according to the present invention. The process begins by fitting the vacuum mold to the former (step 301) and spraying the inside of the mold with a mold release (step 302). It should be pointed out that mold release agents are not always used in vacuum forming. However, experience in developing the method of making a bathtub reveals that a release agent facilitated the even flow of the acrylic over the surface of the mold due to the depth of the mold, such that while optional, it is preferred.

Next, the acrylic sheet is heated (step 303). In one embodiment of making a bathtub for use with a door formed herein or for use in forming a walk-in tub door according to the present invention, the acrylic sheet used to form the tub comprises continuous cast Lucite® XL acrylic 0.187. However, other acrylics with similar characteristics may be used. The oven that is used to heat the sheet is a multi-zoned oven that allows the acrylic sheet to be heated to different temperatures at different points of the sheet.

Figure 4:
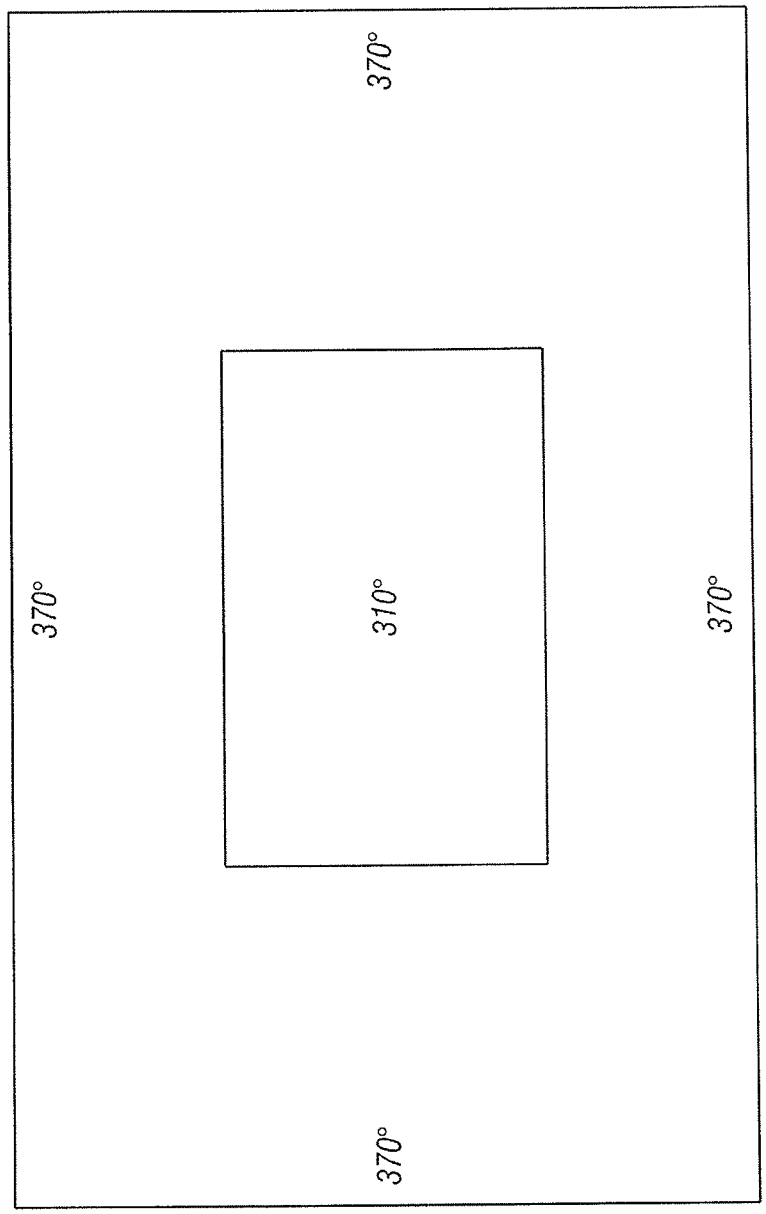
FIG. 4 illustrates the temperature differential used in heating the acrylic sheet in accordance with the preferred embodiment of the present invention.

FIG. 4 illustrates the temperature differential used in heating the acrylic sheet in accordance with one method of making a walk-in tub for use with a door formed according to the present invention. The outer portion of the sheet is heated to about 320° F. to about 420° F., preferably about 360° F. to about 380° F., and most preferably to about 370° F. The inner portion is heated to about 200° F. to about 370° F., preferably to about 260° F. to about 320° F. and most preferably to about 310° F. It would be readily understood to one skilled in the art that such temperatures may be varied depending on the precise material sheet being used, but it is most preferred that there be a temperature differential between the outer portion of the sheet and the inner portion of the sheet of about 40° F. to about 220° F., more preferably about 40° F. to about 120° F., or about 50° F. to about 120° F., and most preferably about 60° F. The purpose of using this temperature differential is to minimize differences in stretching between different regions of the acrylic sheet as it moves along the surface of the mold while cooling. Because of the depth of the foot well in the tub (which can be up to about 33 inches), great care is to be taken to ensure that the acrylic forming the sides of the tub does not cool too quickly as it moves along the sides of the mold. If the acrylic cools too quickly, it will begin to stretch unevenly, with the acrylic becoming progressively thinner as it approaches the bottom of the foot well, similar to stretching a piece of cold taffy. The higher temperature (e.g., 370° F.) used for the outer portion of the acrylic sheet helps to maintain the proper viscosity of the acrylic long enough to complete the vacuum forming process before contact with the mold surface cools the acrylic. The use of the mold release also facilitates the even stretching of the acrylic as it moves over the surface of the mold.

The outer portion is heated at a higher temperature to allow more of that area to be pulled into the foot well. However, if the inner portion was the same temperature as the outer portion, it would have to stretch the full depth of the tub in the area and would pop before reaching the bottom. The temperatures used in the method of the present invention allow for proper distribution of the acrylic sheet to achieve the required thickness at the deepest point in the tub mold design.

Returning to FIG. 3, after the acrylic sheet is heated, the vacuum is activated (step 304), and the heated acrylic sheet is placed over the mold (step 305). The mold is pushed into the heated acrylic two and a half inches and the rest is formed by the vacuum. The vacuum is initially started at a pressure of approximately 25 inches of mercury. However, pressure may be adjusted to accommodate different vacuum mold systems and materials.

In the method of making the walk-in tub for use with the doors formed according to the present invention, the mold may actually be held upside down and the acrylic is drawn upward into the mold. The inverted mold (male mold) configuration is used for bathtub models that have the side apron integrated with the main body of the bathtub as a single piece (explained in more detail below). Manufacturing experience has revealed that attempting to pull an integral apron with the mold positioned right side up in some instances can lead to tearing of the acrylic sheet. Thus, while using a mold facing upright is possible for forming an integral tub, it is preferred to optionally use an upward draw into a male mold if possible to minimize the potential for tearing the sheet.

As the acrylic sheet is drawn into the mold, the vacuum is manually reduced as the acrylic reaches the top of the seat and then shut off when the acrylic is approximately two inches from the bottom of the tub so that the sheet pulls slower (step 306). Due to uncontrollable pressure and environmental changes, this is manual process and requires a skilled vacuum operator. Slowing the vacuum allows a larger part of the sheet to be drawn in the well of the tub (the deepest point). Too much vacuum will cause the center portion of the sheet to overstretch because the outsides of the sheets have not been fully maximized. Shutting off the vacuum approximately two inches above the bottom allows for a consistent uniform forming of the radius.

The acrylic is cooled with air (step 307) and then removed from the mold (step 308). After removal from the mold, the tub is reinforced with fiberglass (step 309). This comprises a multi-step process of spraying fiberglass onto the underside of the molded tub and letting each application of fiberglass cure before adding a further layer. Two to three applications of fiberglass may be used to reinforce the tub, however, more or less may be used depending on the desired level of reinforcement.

Figure 5:
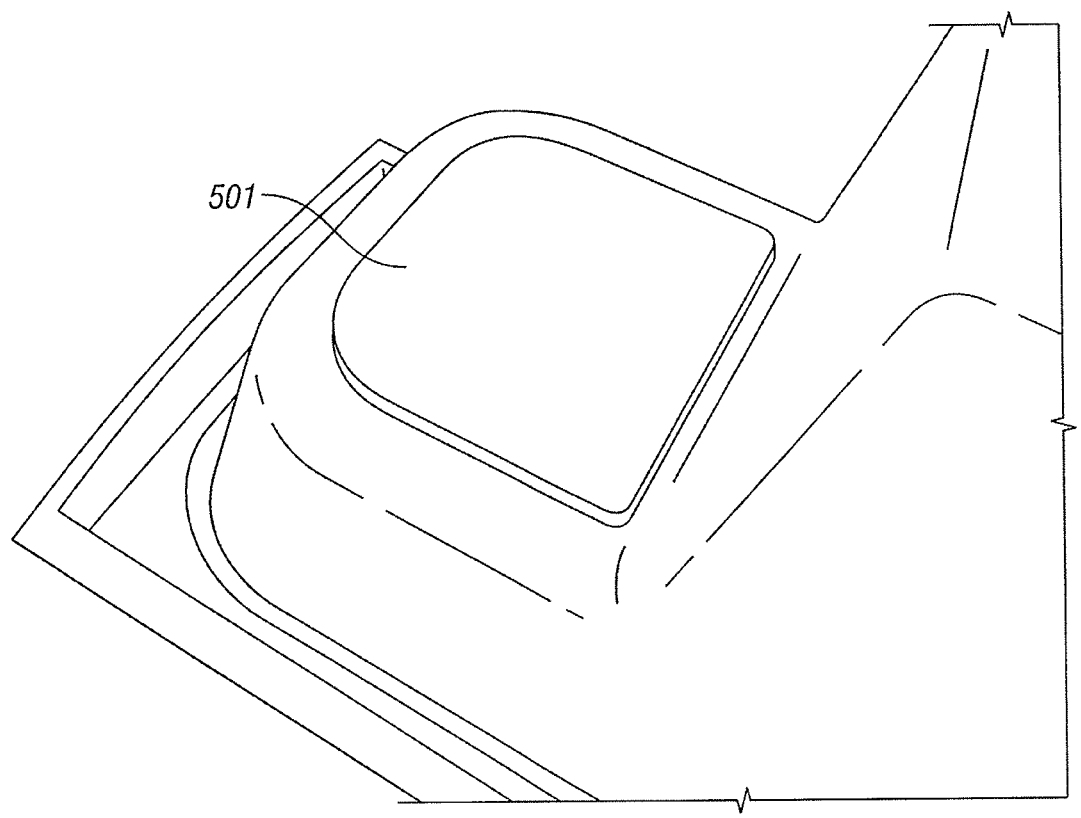
FIG. 5 shows a wood support for the underside of the seat.

Wood or foam supports are fiberglassed to the well (covered by spray fiberglass) and the seat after the first spraying of fiberglass to provide structural support. FIG. 5 shows a wood support 501 for the underside of the seat. The wood support 701 for the foot well is more clearly illustrated in FIG. 7. When using a foam support, one suitable foam is Divinycell® H, available from Diab, Inc. of De Soto, Tex. The use of foam has the essentially the same effect as wood but is typically lighter and will not deteriorate upon exposure to water.

After the fiberglass has cured, the edges of the tub are trimmed from the web and then sanded (step 310).

Figure 6:
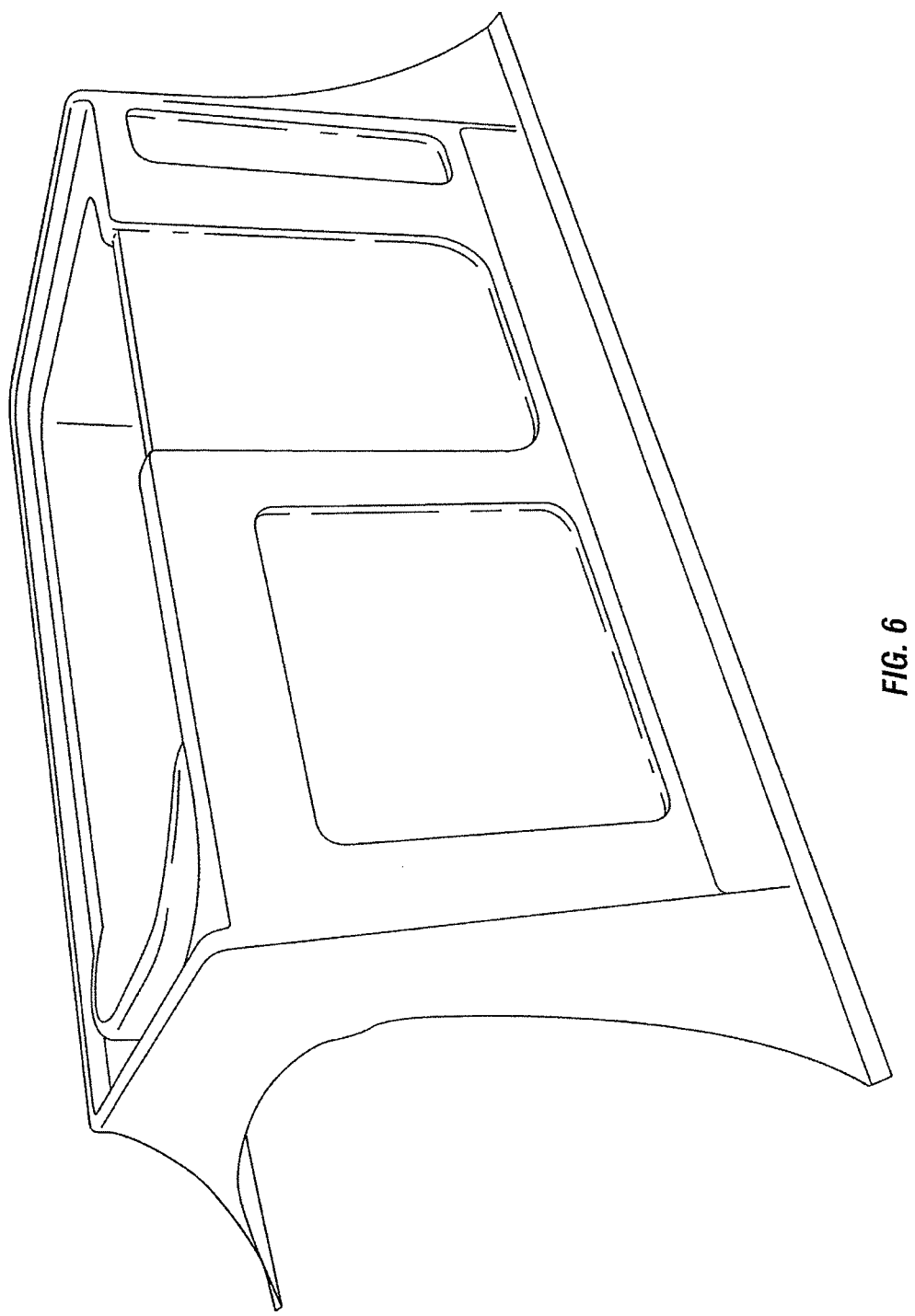
FIG. 6 shows an example of a bathtub with an integrated side apron in accordance with an embodiment of the present invention.
Figure 7:
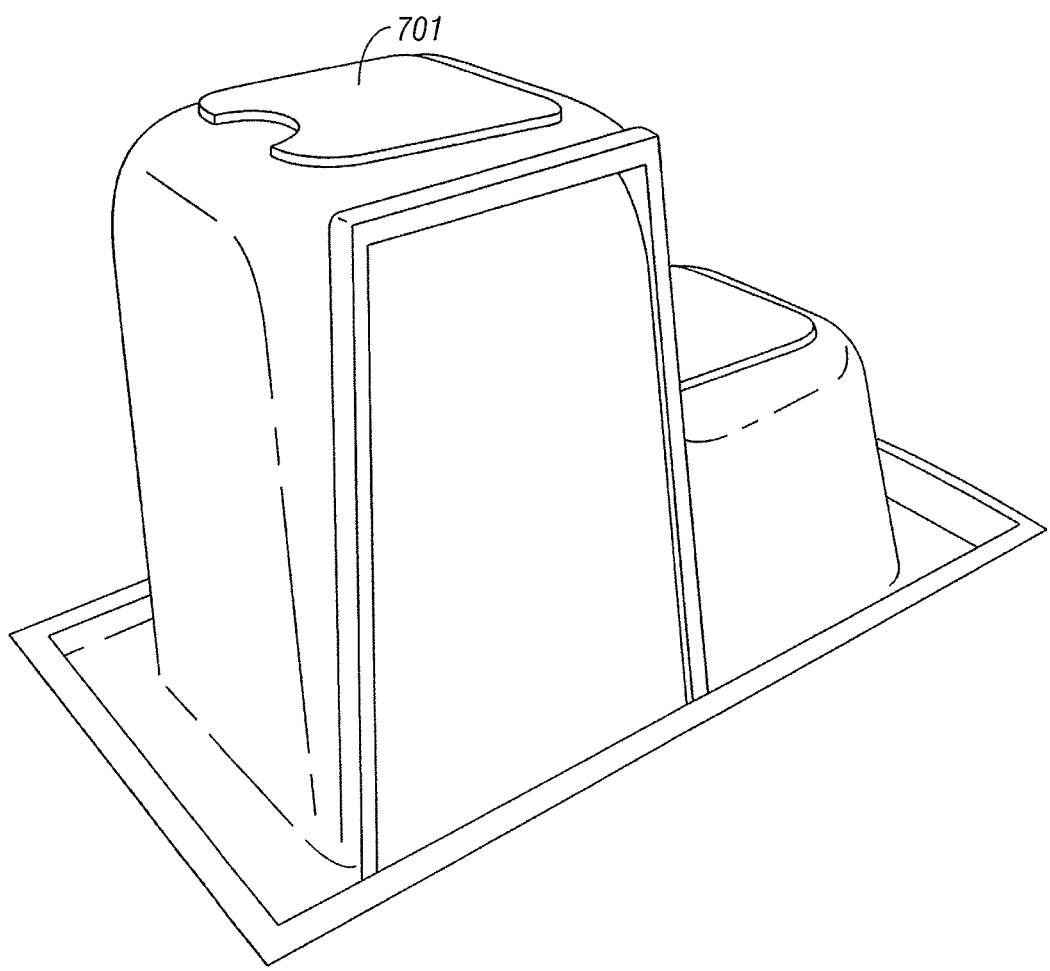
FIG. 7 shows a bathtub without an apron in accordance with an alternative embodiment of the present invention.

The method of making a walk-in tub for use with a door formed according to the present invention can be applied to form two main types of tubs. The first type includes forming a tub having the side apron with the main body of the tub as one integral piece, as shown in FIG. 6. The second type of tub does not include the side apron as an integral piece, as shown in FIG. 7 (which pictures the tub upside down for fiberglass application).

The advantage of having the apron as an integrated part of the tub is that it can significantly reduce the number of manufacturing steps. However, depending on the type of manufacturing technique used, it is possible that an integral tub and apron configuration can, in some cases, limit the depth of the foot well, because the sheet has to be formed inside and outside of the mold and that requires a much larger sheet of acrylic than used for the tub alone. Another disadvantage of the integrated apron in some techniques involves the gap in the door space, as explained in more detail below. The side apron may be manufactured as a separate piece which is later added to the tub; however, it should be understood by one skilled in the art based on this disclosure that either an integral tub or a non-integral tub may be formed within the scope of the invention.

Once the body of the bathtub has been formed, reinforced, and trimmed and sanded, it is secured to a freestanding metal support frame (step 311). As noted above, however, other methods of making a walk-in tub may be used to form a tub for use with a door formed according to the invention, although the various above-described method steps are preferred.

Figure 8:
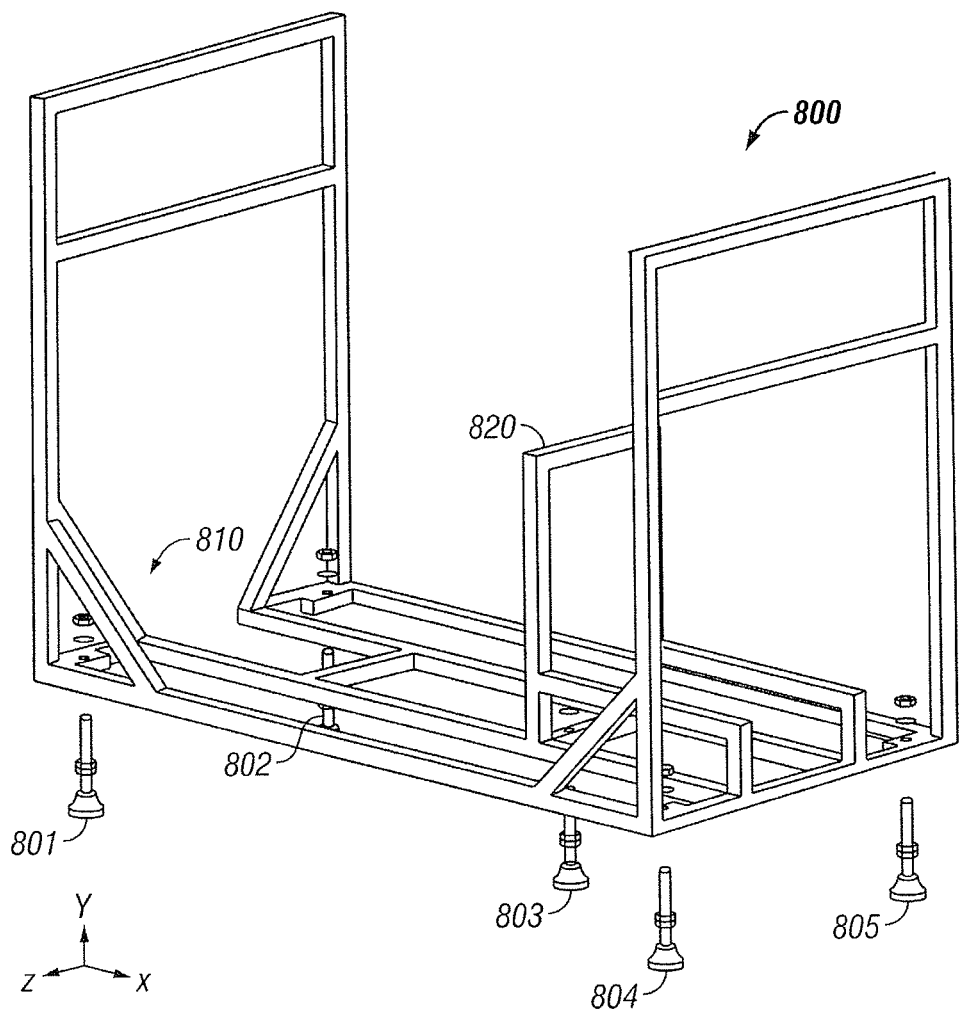
FIG. 8 shows an example of a support frame in accordance with a preferred embodiment of the present invention.

FIG. 8 shows an example of a support frame in accordance with an embodiment of the present invention. The frame 800 is designed to keep the side door from flexing when water is added to the bathtub or due to moisture changes in the bathroom. In addition, its design allows for quick and easy field and manufacturing installation. The cut out 810 on the faucet side makes it easy to install the plumbing. The five adjustable leveling feet 801-805 also enable reverse plumbing, which involves running the faucets under the tub when the door needs to be on a particular side and the plumbing is on the opposite side. The adjustable feet 801-805 also allow one to drop the tub (if the tub plumbing can be recessed into the floor) to further drop the walk-in threshold making it even easier to get into the tub. In the preferred embodiment, the feet allow the tub to be dropped up to two and half inches. The frame 800 also includes a support 820 for the seat of the tub.

Figure 9:
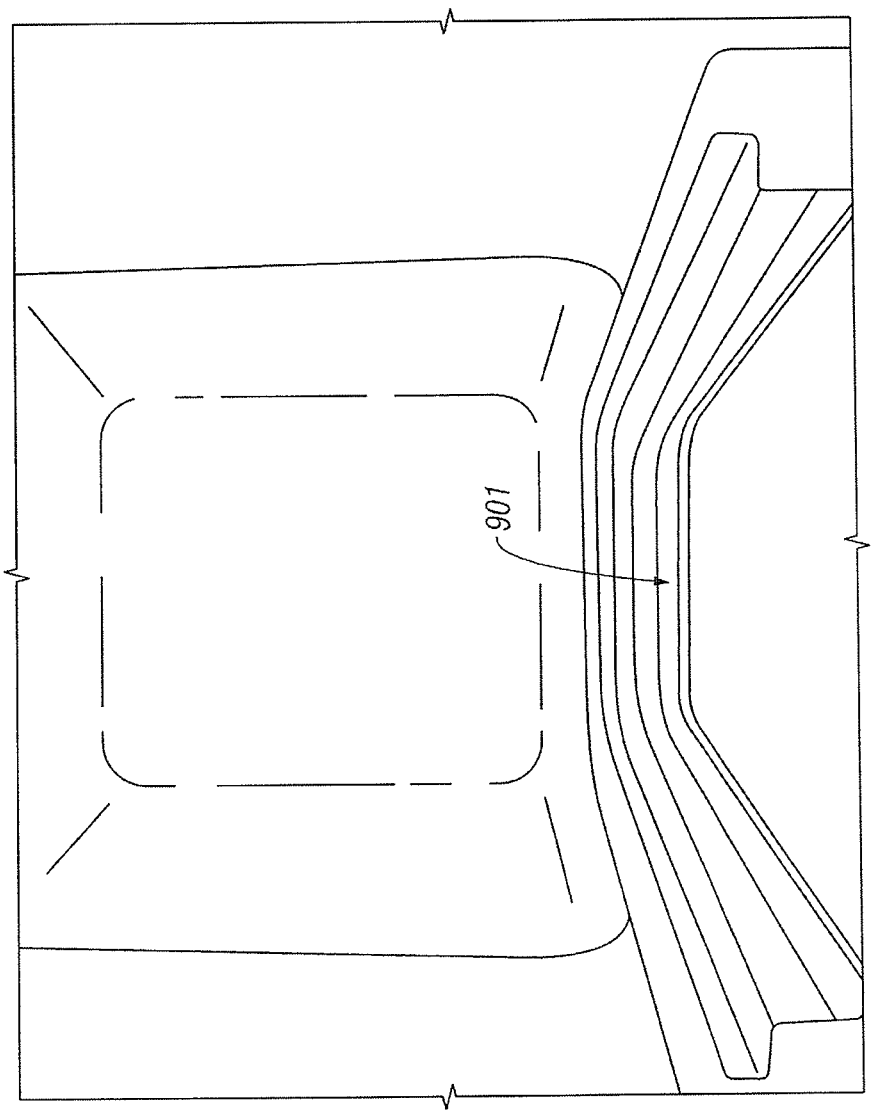
FIG. 9 shows the space between the apron and tub side wall in accordance with an embodiment of the present invention.

The tub and apron may be formed as separate pieces. After the tub has been secured to the frame, the apron is attached to the tub (step 312). The space for the walk-in side door is then cut out of the side of the tub (step 313). Bondo® putty, fiberglass or waterproof filler is added to the space between the apron and tub side wall. This space 901 is illustrated in FIG. 9.

As stated briefly above, the type of apron used determines the amount of space existing between the apron and tub wall, and therefore, the amount of putty that has to be used to fill this space. This is because the bottom of the door threshold that connects the foot well with the apron cannot be formed in the vacuum forming process because the sheet is drawn both to the inside (to create the tub) and the outside (to create the apron), and the thickness of the mold that separates the inside and outside will be the open space when the door is cut out. The example illustrated in FIG. 9 depicts a bathtub with the apron integrated as one piece with the tub.

Figure 10:
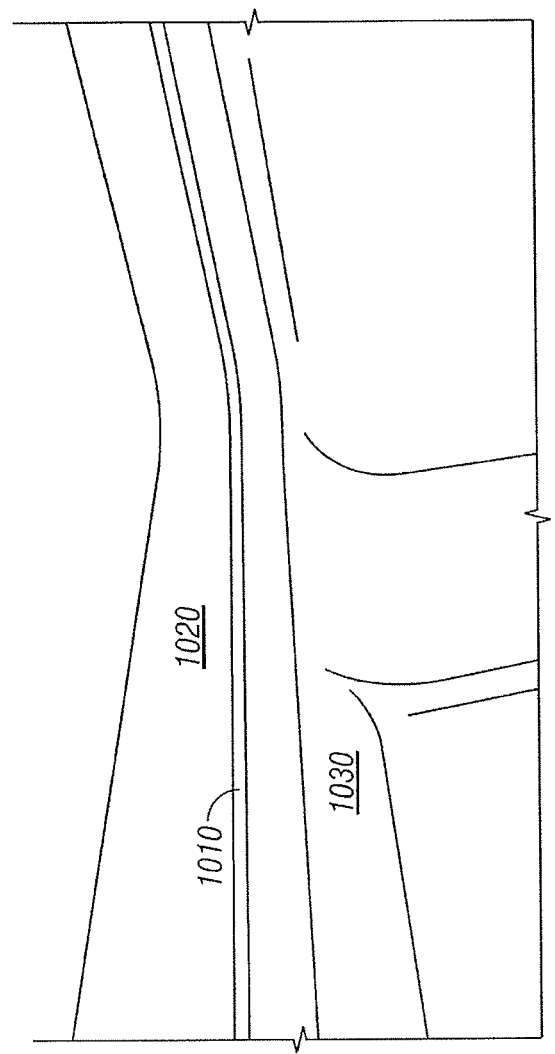
FIG. 10 shows the door threshold of a tub with the apron as a separate piece in accordance with the preferred embodiment of the present invention.

FIG. 10 shows the door threshold of a tub with the apron added as a separate piece. In contrast to the integrated apron, if the apron is added to the tub as a separate piece there is a smaller gap between the apron and tub wall because the apron can be constructed to cover the necessary space of the door threshold and is then attached to the tub. An important feature of the apron is the depth of the threshold, which in the preferred embodiment is approximately two and a half inches. As can be seen in this example as shown in FIG. 10, there is a smaller gap 1010 between the apron 1020 and tub wall 1030, than that shown in FIG. 9, which can significantly reduce the labor intensive manufacturing steps of filling the entire threshold with putty.

Figure 11:
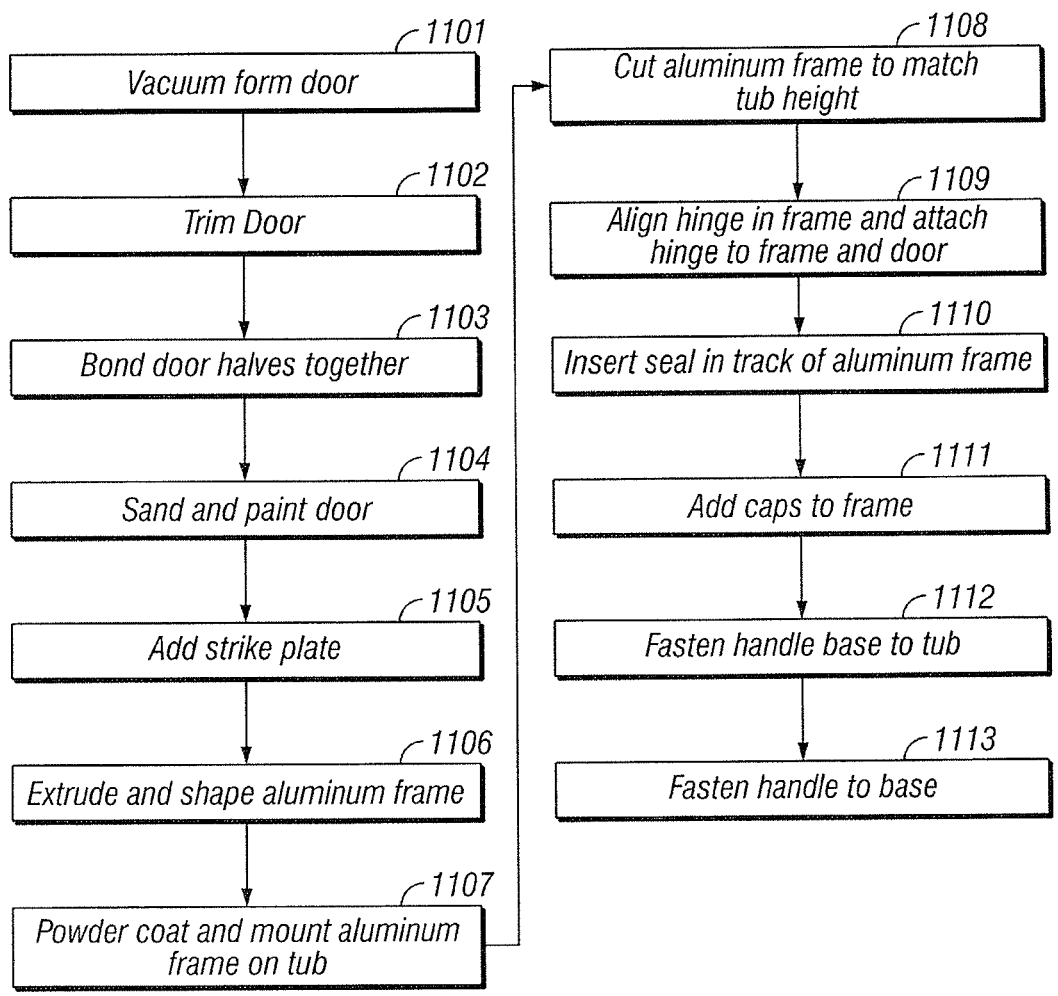
FIG. 11 is a flowchart depicting the process of manufacturing a door assembly for a walk-in bathtub in accordance with the prior art.
Figure 12:
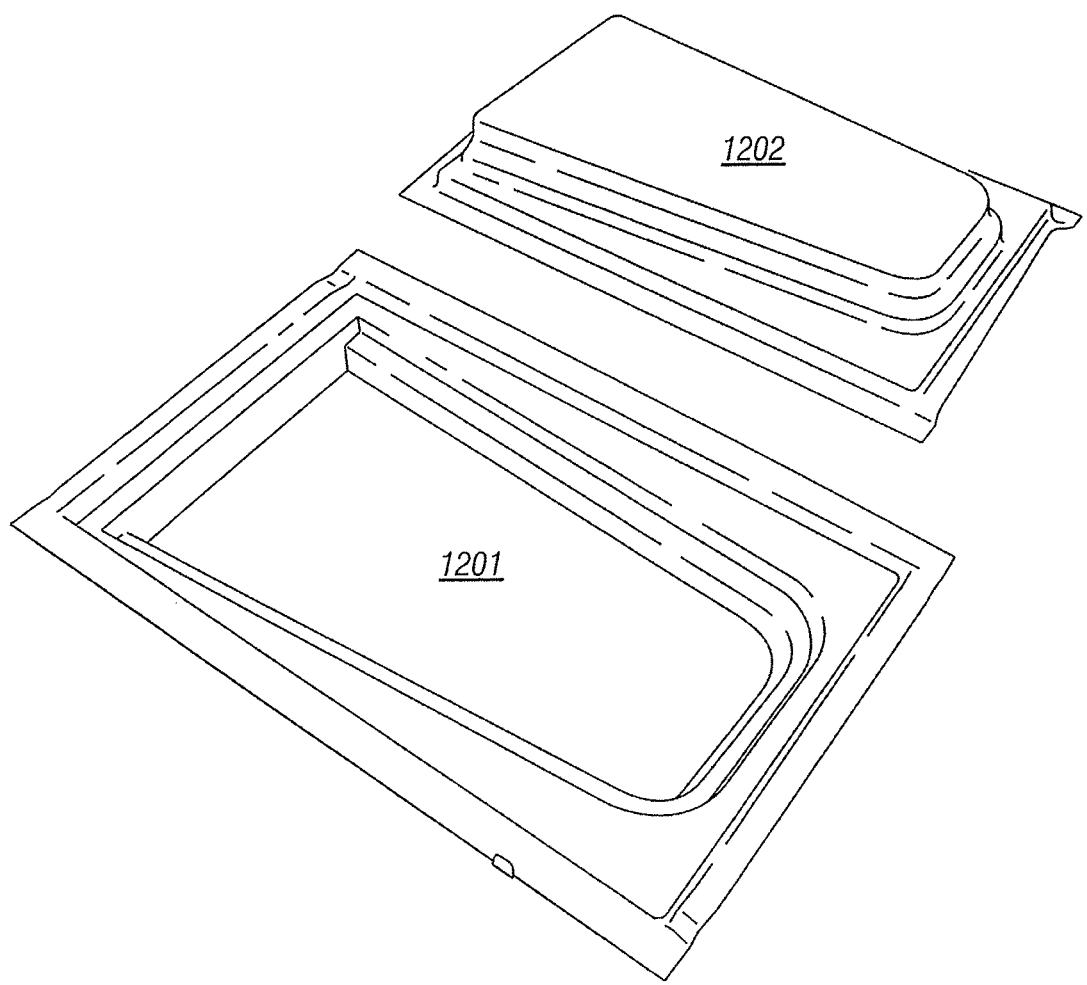
FIG. 12 shows two example prior art threshold door pieces, one facing up and the other facing down.

Referring now to FIG. 11, a flowchart illustrates a prior art embodiment of a process of manufacturing a door assembly for a walk-in bathtub. The door itself is comprised of two main pieces. The threshold piece is vacuum formed to fit within the door threshold in the side of the tub (step 1101). FIG. 12 shows two examples of the prior art threshold door pieces 1201, 1202, one facing up and the other facing down. After the threshold piece is vacuum foamed, it is trimmed from the web (step 1102).

Figure 13:
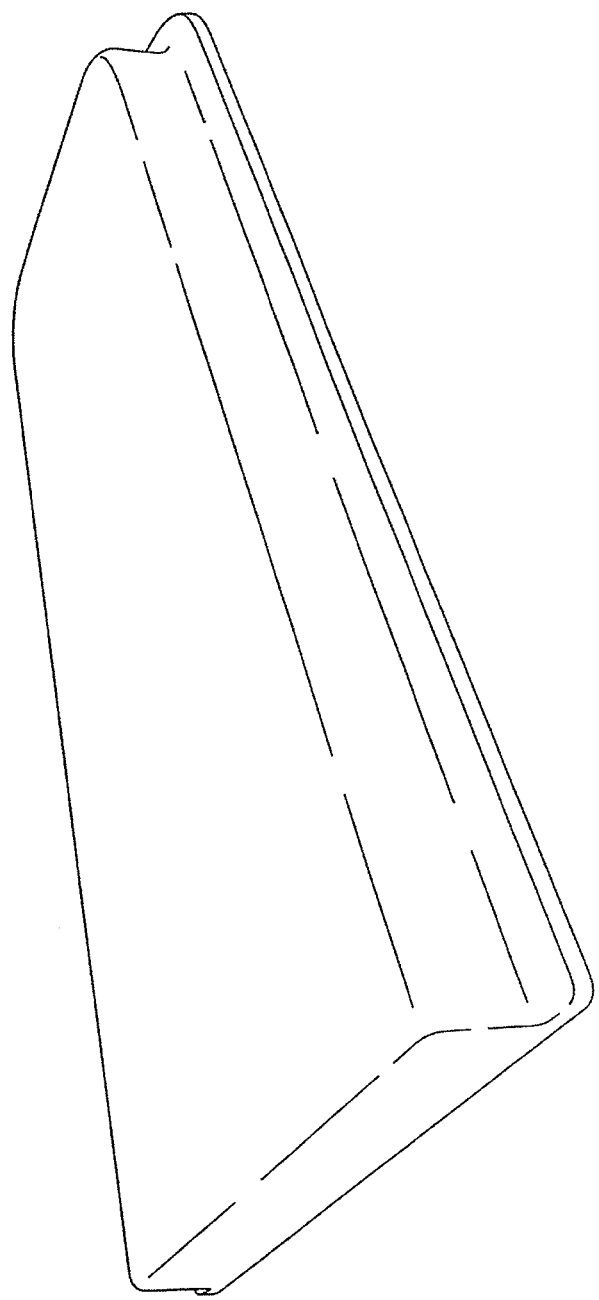
FIG. 13 shows an assembled prior art side door after it has been sanded and painted.

The second piece of the door is a flat panel that simply covers the indentation of the threshold piece. The two door halves are bonded together (step 1103), and the door is then sanded and painted, as shown in FIG. 13 (step 1104). After that, the strike plates are added (step 1105).

In making a door as noted above, the prior art finished door includes two vacuum-formed acrylic pieces, first the outer shell (threshold portion) of the door was formed, and door was trimmed out, following which a flat piece of acrylic thin sheet (cap), which is typically strengthened with sprayed fiberglass is formed and the two pieces are affixed to one another, for example, with Bondo® putty or the like. In such a construction, the adhesion seam can be in the water line. The pieces are preferably placed in a holding fixture while curing and then trimmed to the shape of the door, sanded and painted. The door is then buffed to finish the product. This making for making a walk-in tub door is effective, but can be labor intensive.

Figure 27:
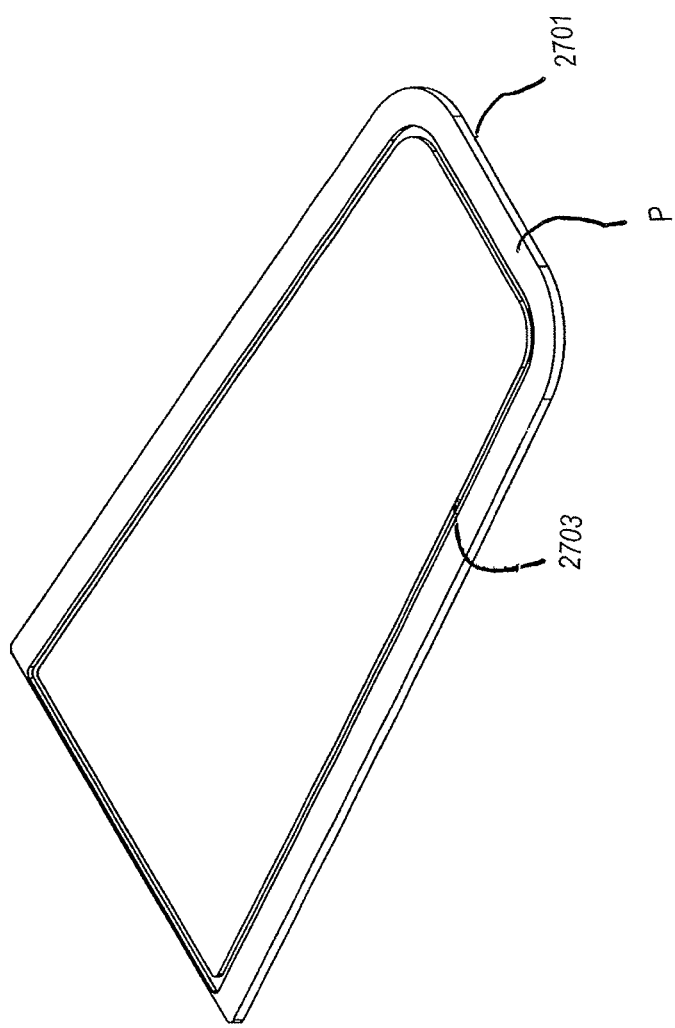
FIG. 27 is a perspective view of a door cap of a walk-in door formed from a solid piece of cast acrylic according to one embodiment of the invention.
Figure 28:
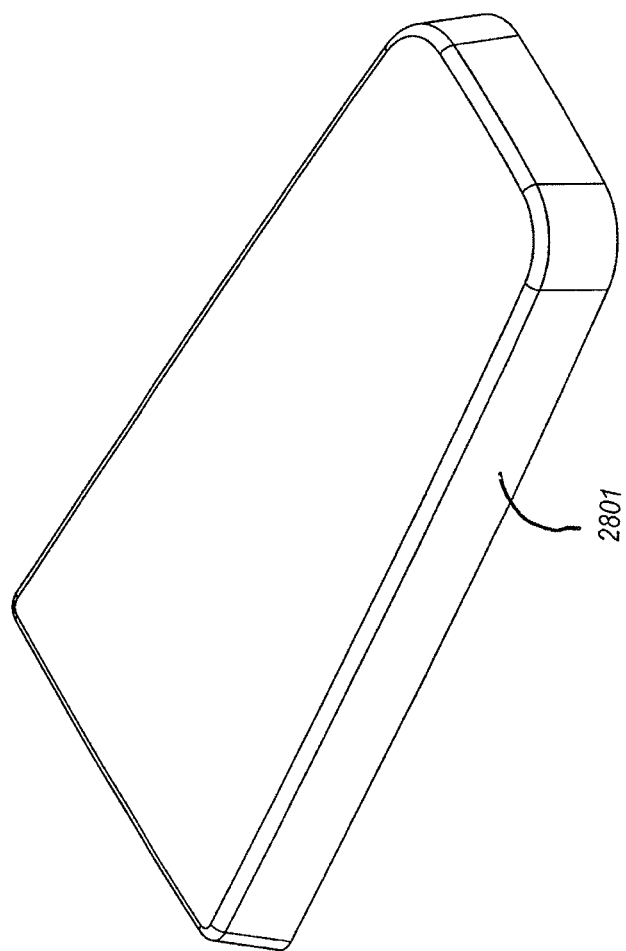
FIG. 28 is a perspective view of a threshold piece of a walk-in door formed by vacuum molding according to the embodiment of the invention of FIG. 27.
Figure 30:
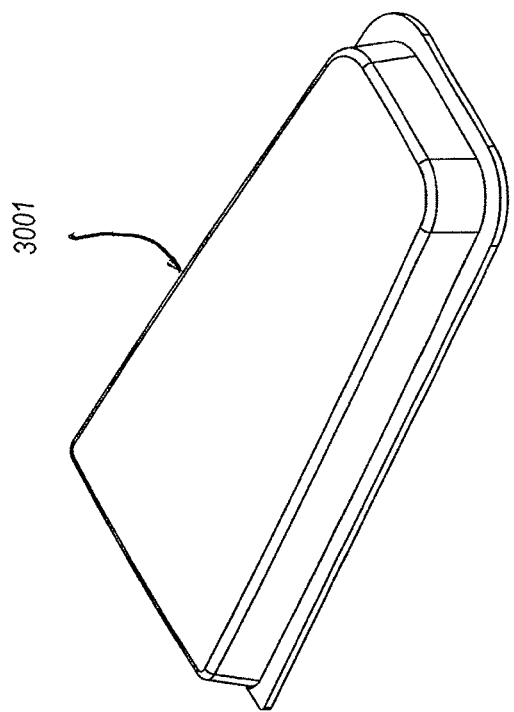
FIG. 30 is a perspective view of a door cap according to FIG. 27 bonded to the threshold piece of FIG. 28 forming a walk-in tub door.
Figure 29:
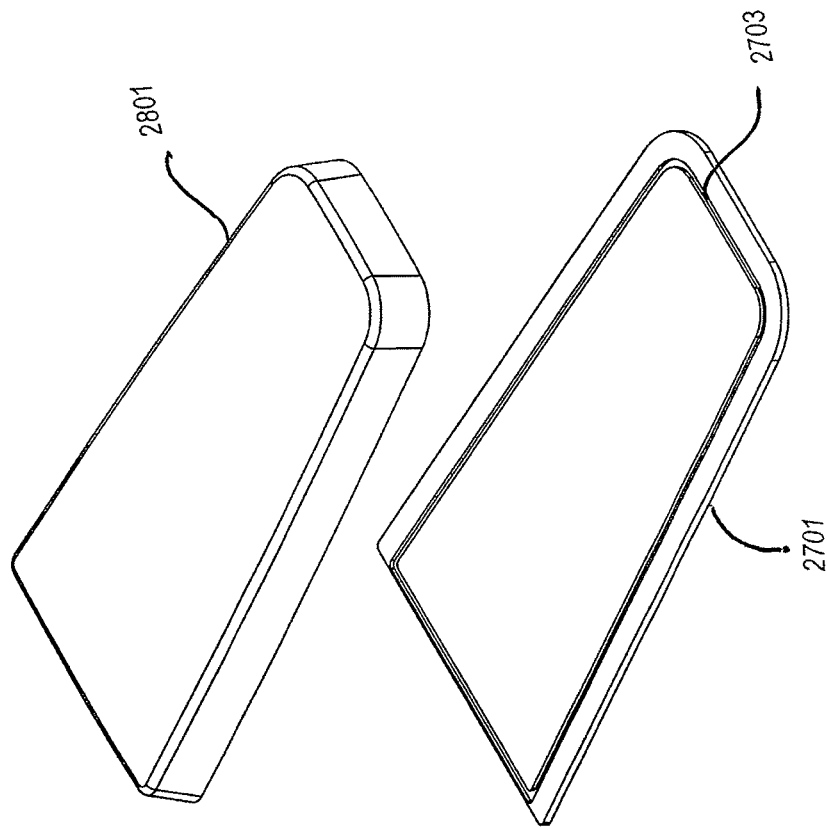
FIG. 29 is a perspective view of the door cap of FIG. 27 being aligned with the threshold piece of FIG. 28.

According to the invention, a door for a walk-in tub can be formed as shown in FIGS. 27 to 30. In this method for walk-in tub door according to FIGS. 27 to 30, a door is provided which is preferably formed from cast acrylic. Preferably, the sheet is reinforced by various techniques, including co-extrusion, reinforcing materials or fillers or use of fiberglass spray. Preferably the sheet is reinforced by coextruding the acrylic material with another thermoplastic, such as acrylonitrile-butadiene-styrene (ABS) or a similar material. The resulting reinforced sheet is preferably cast, formed or otherwise formed into a plate (cap). As shown in FIG. 27, the solid sheet of reinforced acrylic (e.g., coextruded sheet) is provided 2701 and then a channel 2703 is preferably machined into, or routed out of the sheet, along a peripheral area P thereof. A threshold door portion 2801 is then adhered directly to the cap sheet 2701 to provide an aesthetic look or shape to the door. The cap sheet is a little thicker, but more of a standard sheet. The resulting door and method for making the same allows for easy attachment of the threshold piece 2801 to the cap in the area of the channel 2703 as shown in FIG. 29. After formation, the new door 3001 is complete as shown in FIG. 30. The seam between the two parts is preferably then filled in with color-matched filler.

With reference to FIG. 11, after the door is formed, the frame for the door assembly whether made by the prior art method or the present inventive method comprises a single aluminum piece that is extruded and shaped to fit the edge of the door threshold (step 1106). The extruded frame includes a channel for a rubber gasket that forms part of the tub's water seal. In the preferred embodiment, the extrusion is made with 60-61 or 60-63 aluminum. This type of aluminum allows the extrusion to be bent into the proper shape without pinching the gasket channel. The mounting and the following finishing steps are known in the art and may be used with doors formed according to the present invention for mounting; however other mounting methods are acceptable which are known in the art or to be developed.

Figure 14:
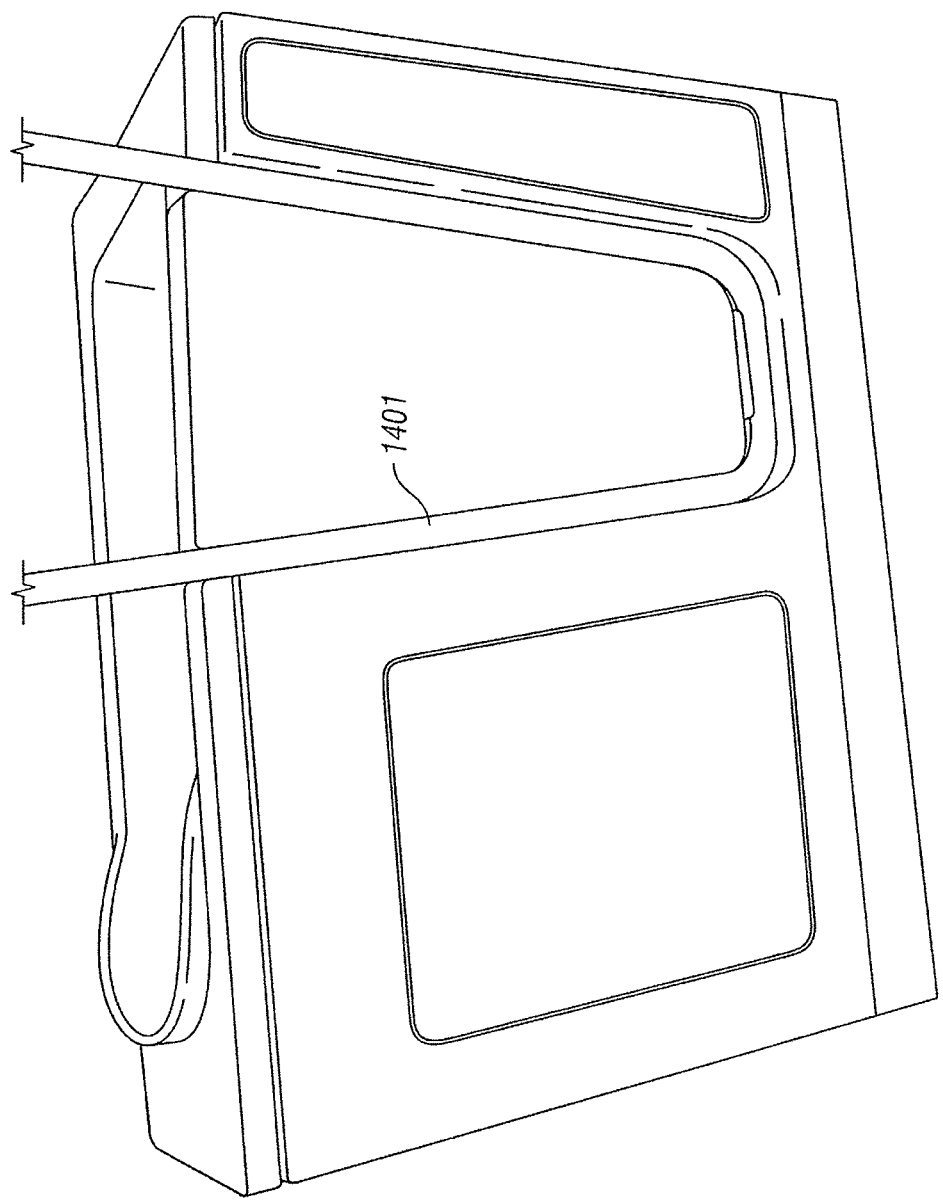
FIG. 14 shows the door frame mounted in place on the door threshold.

After it has been shaped, the extrusion is powder coated and mounted onto the tub (step 1107). FIG. 14 shows the door frame 1401 mounted in place on the door threshold. The frame is secured to the threshold with a waterproof adhesive (e.g., GT-3100 Neutral). The frame 1401 is then secured to the tub by a retaining screw (not shown) to supplement the adhesive.

Figure 15:
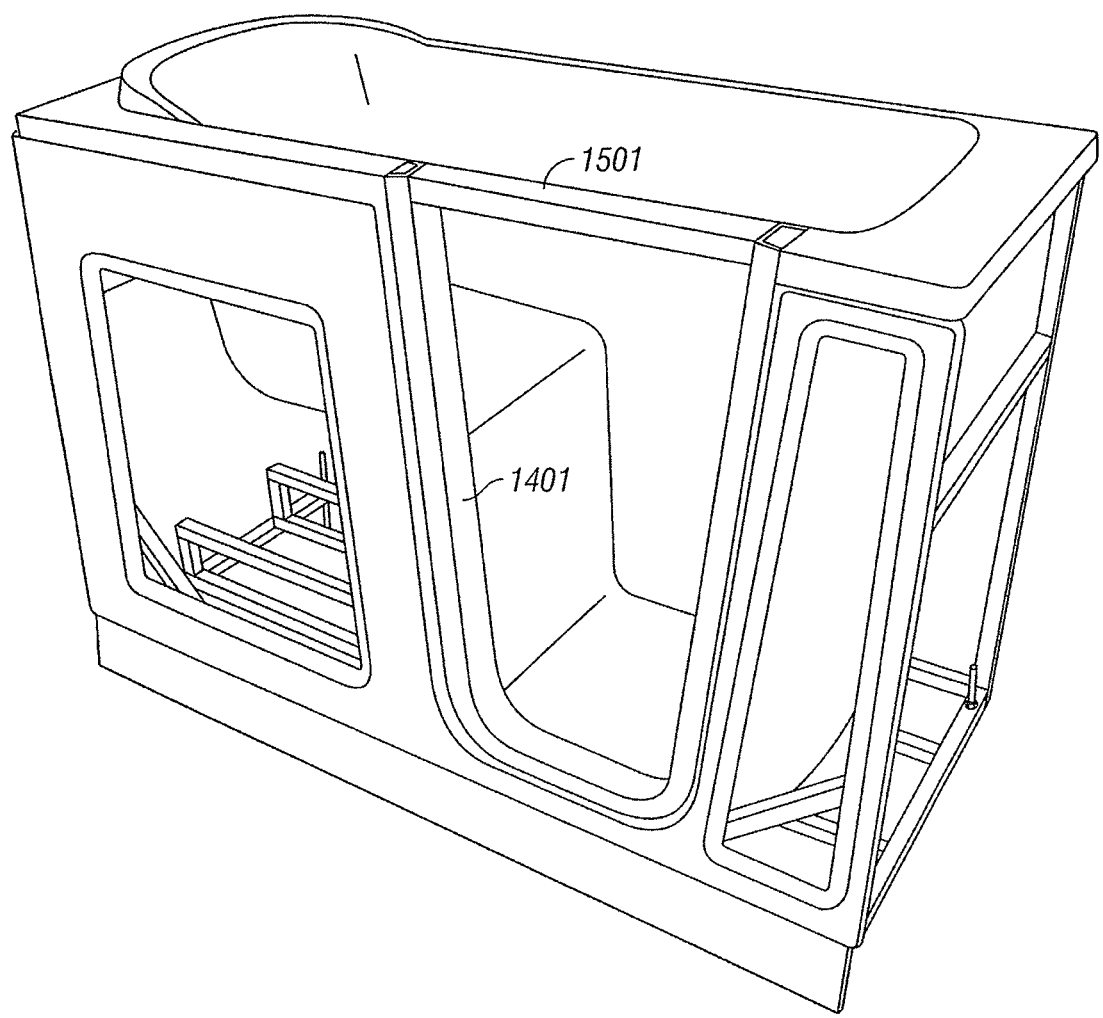
FIG. 15 shows the door frame trimmed to match the height of the tub.

Once is place, the ends of the extruded frame are cut to match the height of the tub (step 1108). FIG. 15 shows the extrusion 1401 after it has been trimmed. As shown in the Figure, a piece of wood 1501 or other material may be used to secure the ends of the extrusion 1401 while the adhesive sets.

Figure 16:
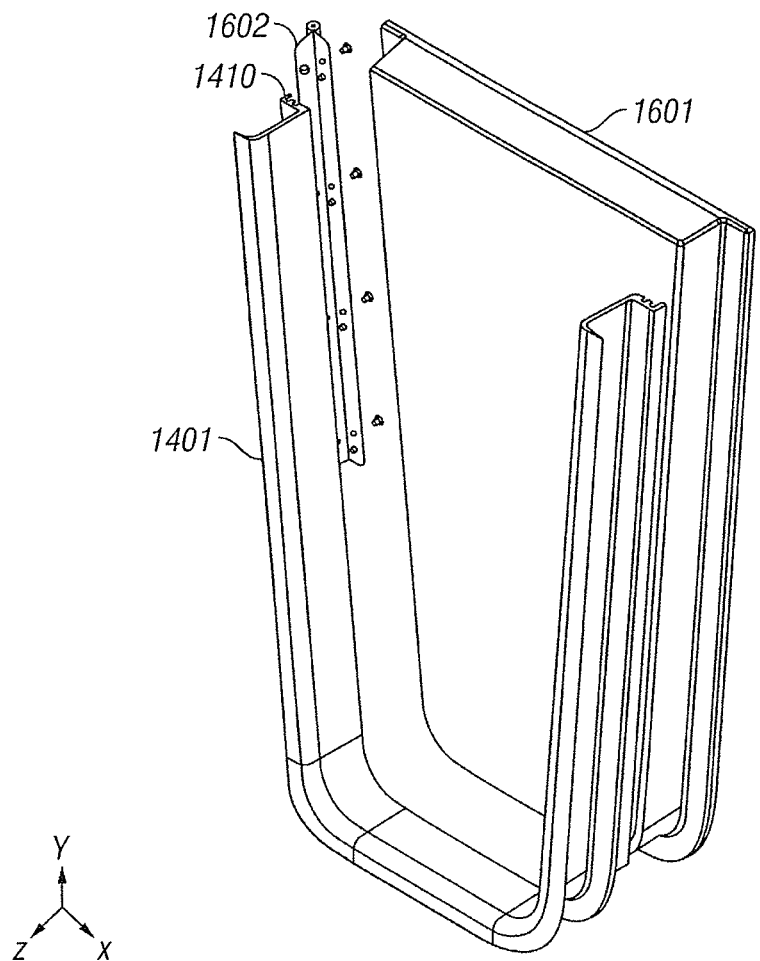
FIG. 16 shows an exploded perspective view illustrating how the door frame, door, and hinge fit together.

After the door frame is securely in place, the hinges of the door are aligned and attached to the frame and door (step 1109). FIG. 16 shows an exploded perspective view illustrating how the door frame 1401, door 1601, and hinge 1602 fit together. The frame includes a track 1410 on the outer edge that is specifically dedicated to mounting the hinge 1602.

Figure 17:
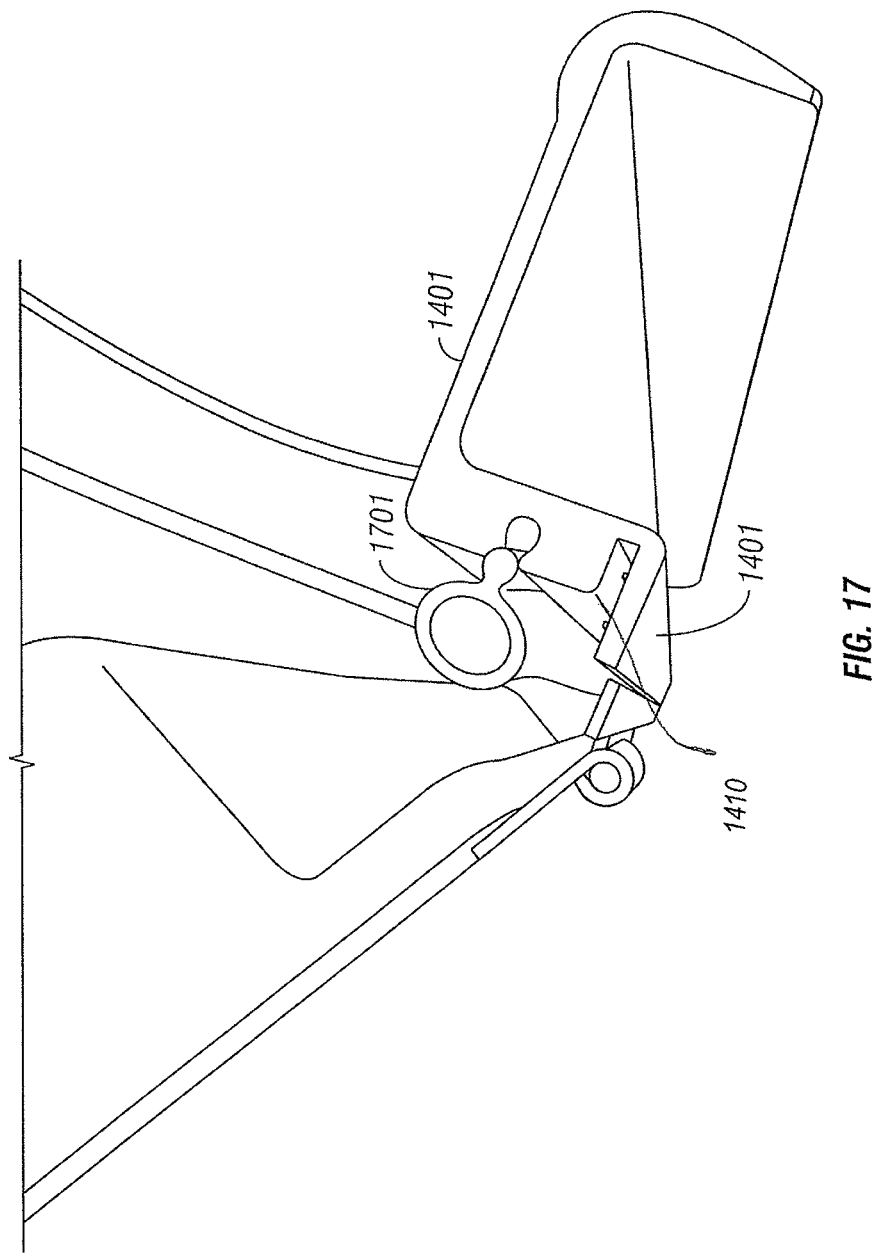
FIG. 17 shows a gasket into the designated track of the frame in accordance with the preferred embodiment of the present invention.

After the door is mounted, a gasket is inserted into the seal track of the frame, as illustrated in FIG. 17 (step 1110). The gasket 1701 helps form the water tight seal of the door. FIG. 17 also clearly shows the dedicated hinge track 1410 on the door frame 1401.

Figure 18A:
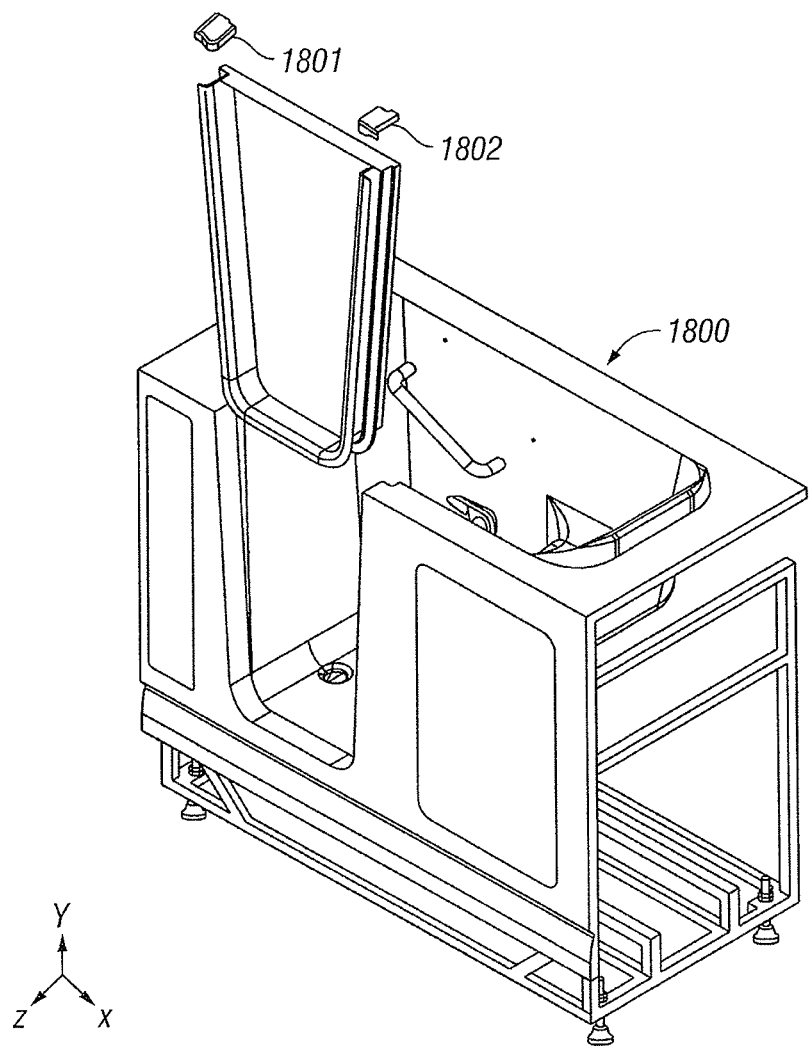
FIG. 18A is an exploded perspective view of the walk-in bathtub showing the relationship between the main components of the tub.
Figure 18B:
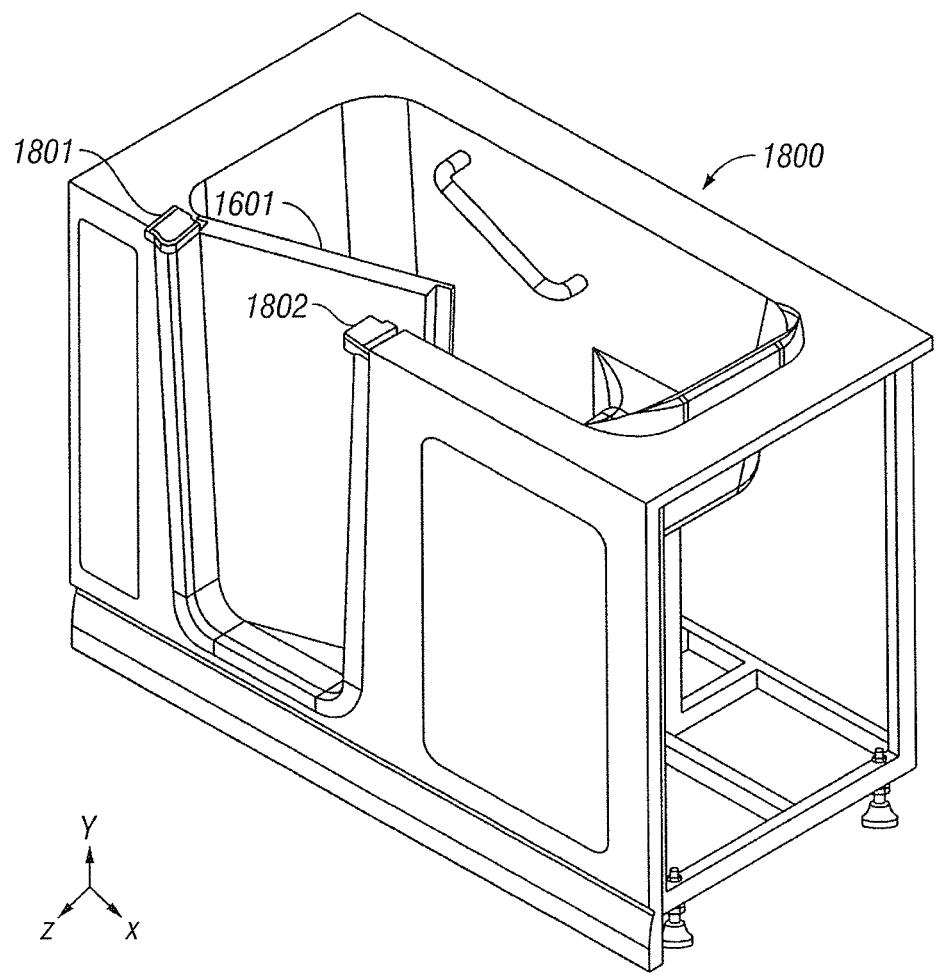
FIG. 18B shows a perspective view of the fully assembled walk-in bathtub.

Caps 1801, 1802 are added to ends of the aluminum frame, as show in FIGS. 18A and 18B, which shows a finished tub and door (step 1111). Using caps over ends of the frame helps reduces labor costs and speeds up the production process, as well as helping to blend the extrusion with the tub frame.

Figure 19:
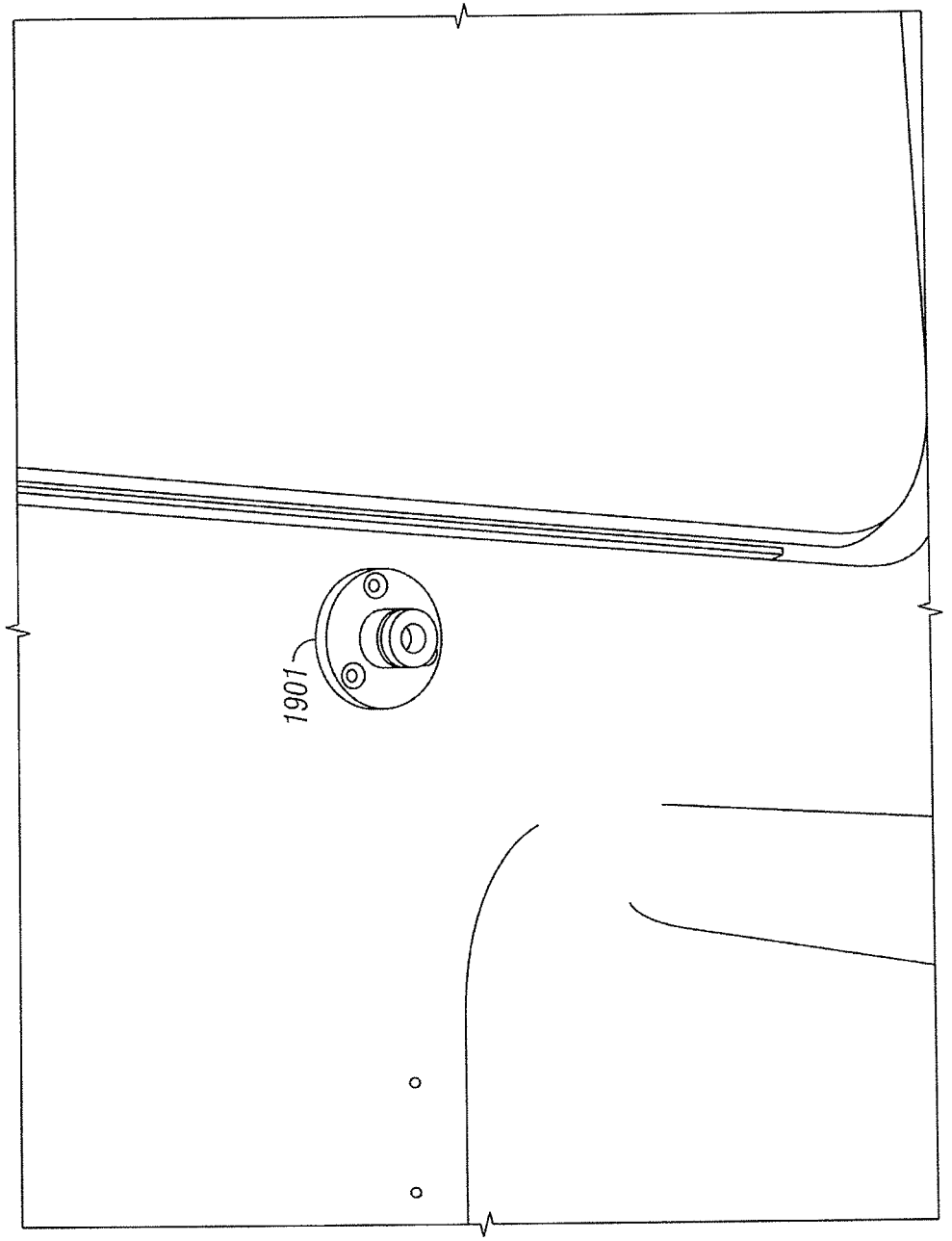
FIG. 19 shows the base for the door handle mounted onto the inside wall of the bathtub.
Figure 20:
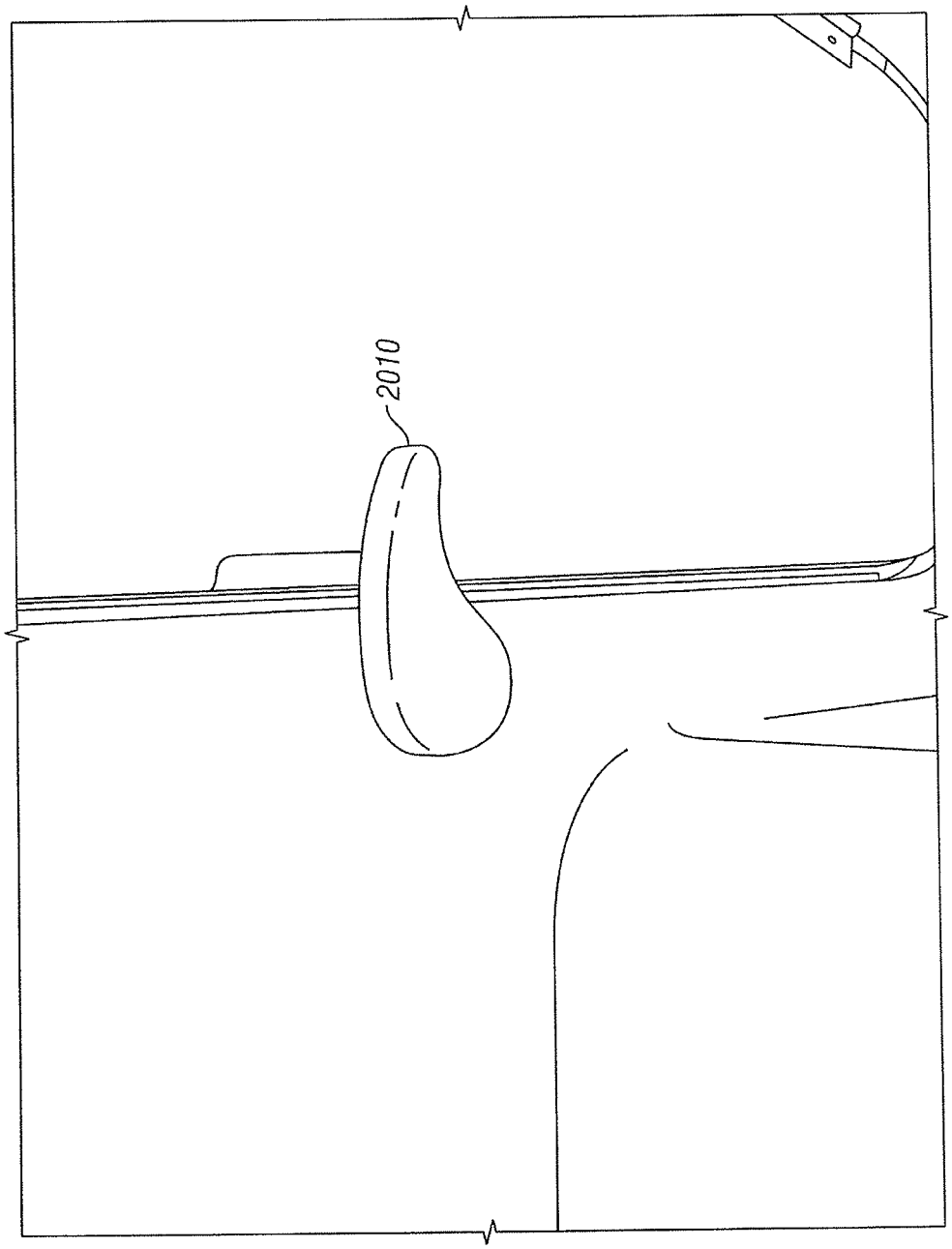
FIG. 20 shows the door handle mounted onto the handle base.

Finally, the handle base 1901 is fastened to the tub (step 1112), shown in FIG. 19. The handle 2010 is then fastened to the base, as shown in FIG. 20 (step 1113).

The door of the present invention is similar to a regular pre-hung door that would be found in a house and can be installed into the tub as a separate, pre-assembled unit. Other prior art walk-in tubs have the door attached directly to the side of the tub, which is analogous to mounting a house door directly to the wall. The preferred extruded frame for use with doors formed according to the present invention provides structural integrity to the tub and insures proper alignment of the system as it is contained as one unit. The frame keeps the walls of the tub from flexing, and the dedicated hinge track helps keep the door aligned, thus maintaining the integrity of the water seal. The metal frame also improves the door seal by covering surface inconsistencies that often occur with acrylic, especially at the depths used in the present invention (i.e. up to 33 inches). In addition, the frame improves the door seal by provides a dedicated track for the gasket. The dedicated tracks also allow for easy maintenance if anything goes wrong in the field.

FIG. 18A is an exploded perspective view of the walk-in bathtub 1800 showing the relationship between the main components of the tub. FIG. 18B shows a perspective view of the fully assembled walk-in bathtub 1800. As shown in FIG. 18B, the door 1601 may open to the inside of the tub 1800 like some prior art tub doors, but unlike other doors such as the prior art tub of FIG. 1. Because the side door 1601 opens to the inside, the water seal is largely maintained by outward hydrostatic pressure when the tub is filled with water.

Figure 21:
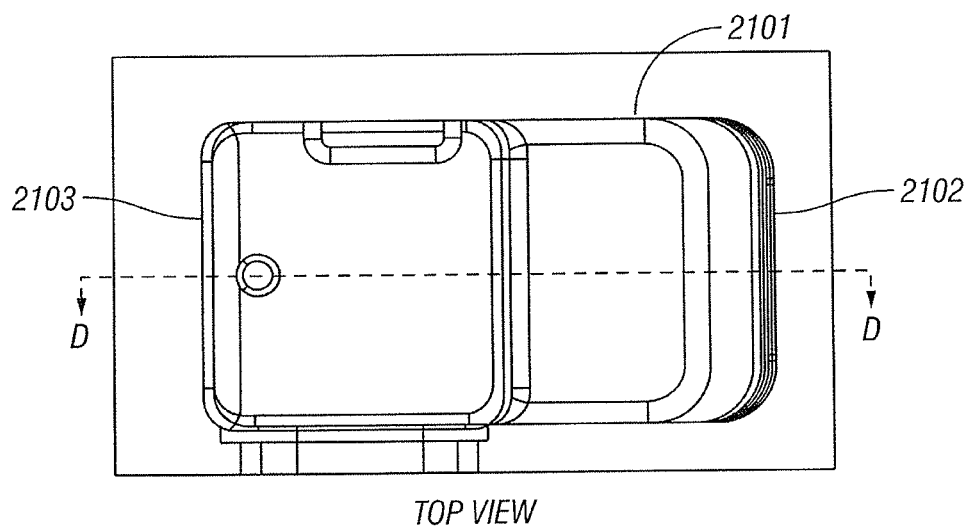
FIG. 21 is a top plan view of the assembled walk-in bath tub.

FIG. 21 is a top plan view of the assembled walk-in bath tub.

Figure 22:
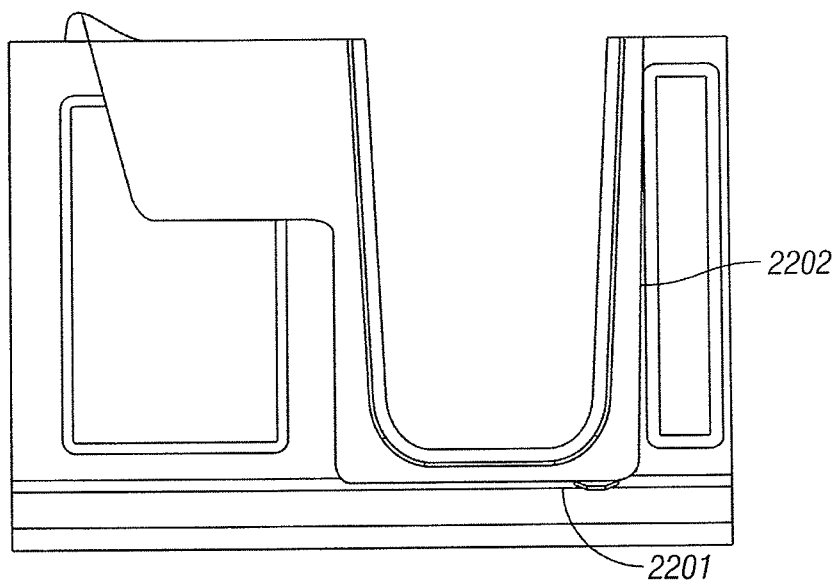
FIG. 22 is a cut away side view of the walk-in bathtub.

FIG. 22 is a cut away side view of the walk-in bathtub. This view clearly shows the depth of the foot well in relation to the seat of the tub.

An important element in properly vacuum forming the acrylic tub is using the proper radius for each corner of the tub. If one attempts to make sharper radii, this will invariably tear the acrylic during the vacuum forming process. As can be seen in FIGS. 21 and 22, each corner of the molded tub is rounded. For example, the bottom edge of the foot well of the tub has a radius of three inches (76.2 mm). The radius refers to the distance taken to make the rounded transition from one straight surface to another, in this case the horizontal bottom 2201 to the vertical wall 2202 of the foot well. (If the corner was 90°, the radius would of course be zero.) Similarly, the radius between the side walls 2101, 2102 in the seat area is approximately nine inches (228.6 mm), while the radius between the side walls 2101, 2103 of the foot well is approximately two and a half inches (63.5 mm). The preferred method of making a tub for use with a door formed according to the present invention may be used to make walk-in tubs of various depths, lengths and widths. However, experience has demonstrated the above radii to be the most consistently useful regardless of the dimensions of the tub.

The preferred method of forming a walk-in tub for use with a door formed according to the present invention in a walk-in tub assembly allows for the vacuum forming of acrylic to depths that are unattainable by alternate methods relative to width and length. In one embodiment of the present invention, the floor of the foot well is about 17 inches below the height of the seat, with an overall depth of about 33 inches. The length and width of the opening of the tub are about 43 inches and about 24 inches respectively. This depth relative to length and width is not possible using other methods.

Figure 23:
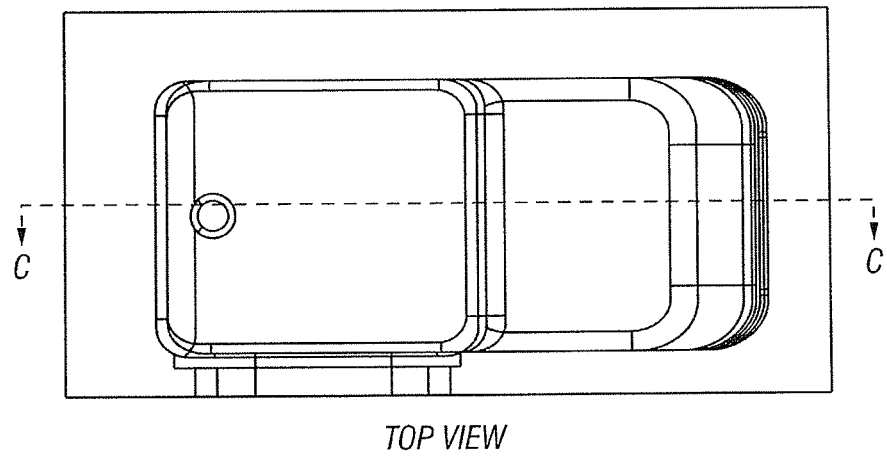
FIG. 23 is a top plan view of an alternate embodiment of the walk-in bath tub.

FIG. 23 is a top plan view of an another walk-in bath tub that made be used with a door formed according to the invention. This tub is similar in dimensions to the one pictured in FIGS. 21 and 22 but with a narrower width.

Figure 24:
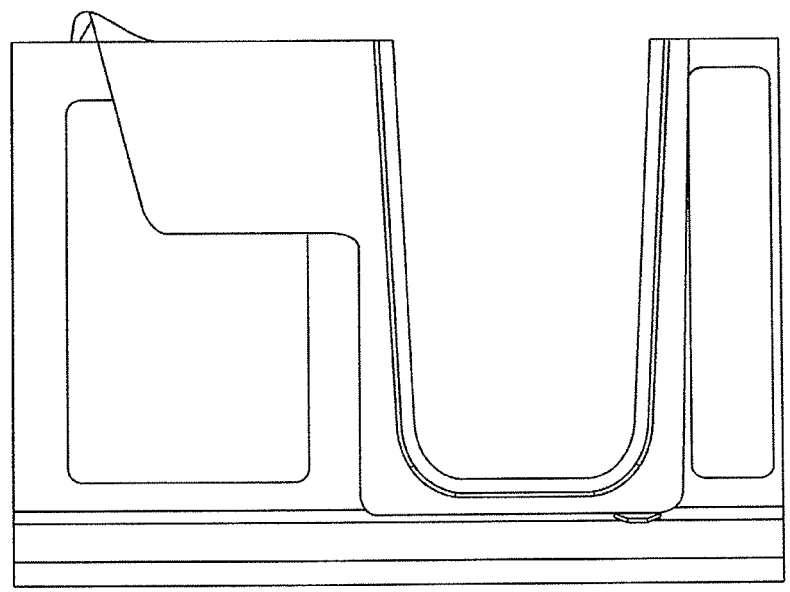
FIG. 24 is a cut away side view of the walk-in bathtub depicted in FIG. 23.

FIG. 24 is a cut away side view of the walk-in bathtub depicted in FIG. 23.

Figure 25:
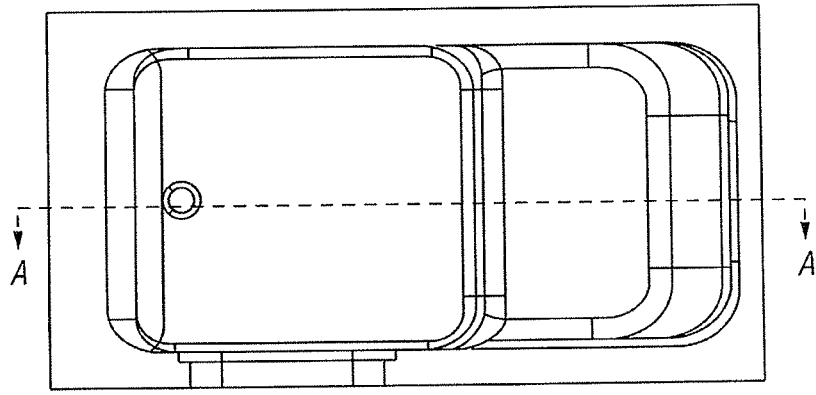
FIG. 25 is a top plan view of yet another embodiment of the walk-in bath tub.

FIG. 25 is a top plan view of another walk-in bath tub. This tub variation has a shallower depth and slightly greater length than the embodiments depicted in FIGS. 21-24.

Figure 26:
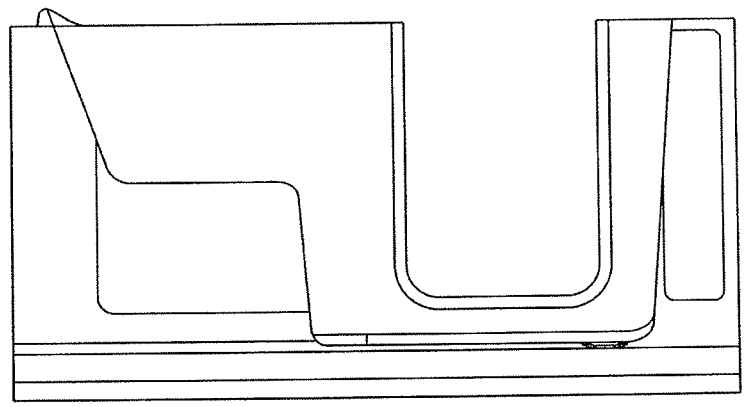
FIG. 26 is a cut away side view of the walk-in bathtub depicted in FIG. 25.

FIG. 26 is a cut away side view of the walk-in bathtub depicted in FIG. 25.

Figure 32:
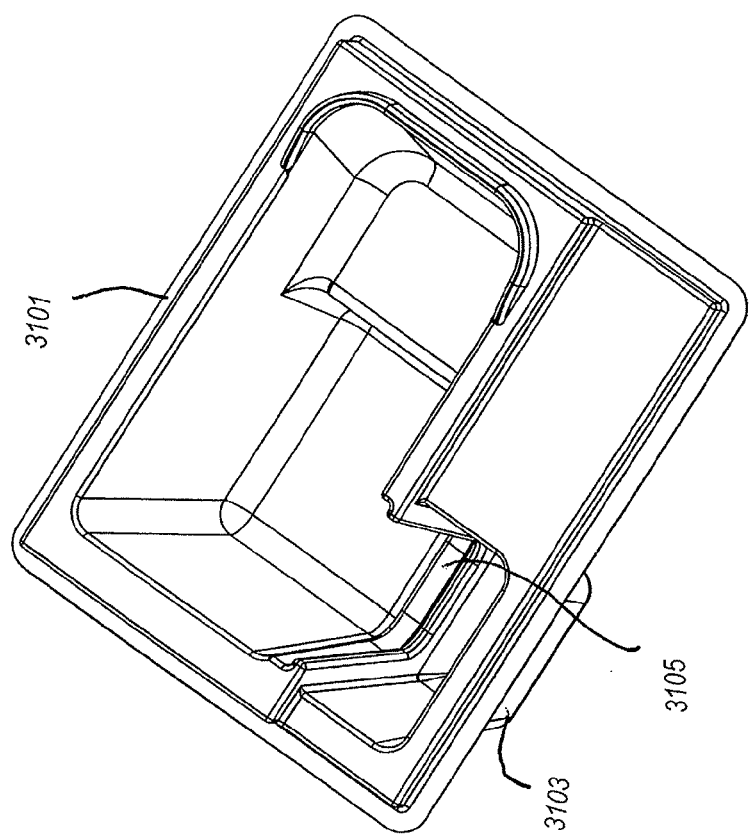
FIG. 32 is a top perspective view of the molded piece shown in FIG. 31.
Figure 31:
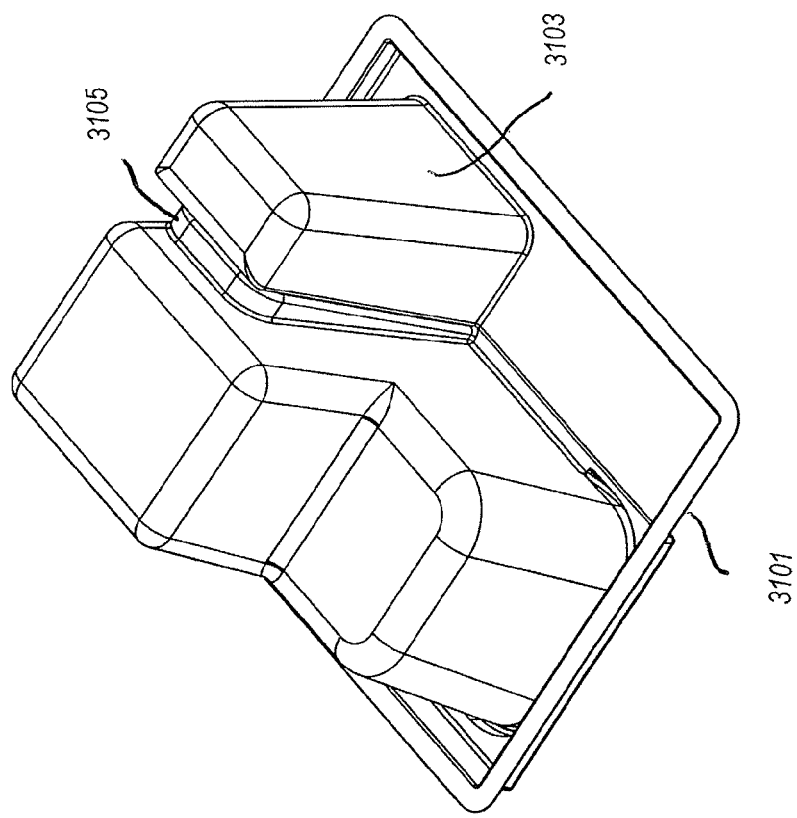
FIG. 31 is a bottom perspective view of a molded piece for forming a bathtub having an integral threshold.

FIGS. 31 and 32 illustrate that instead of having to form a separate threshold for the molded tub that is bonded to the tub and/or apron after formation, a mold can be provided which has a shape as shown in FIGS. 31 and 32, wherein FIG. 31 shows the bottom of the mold shape and FIG. 32 shows the top of the mold shape. The mold itself is formed and operates as shown in FIGS. 2A to 2D, however, the shape of the mold design would be as shown in the finished mold piece 3101 shown in FIGS. 31 and 32. The primary difference in mold design 3101 is the well 3103 which provides a pre-formed threshold 3105. The additional well 3103 is added to give the acrylic or other forming material a place to draw and stretch into during vacuum forming. After the mold piece 3101 is formed, the extra well 3103 is trimmed off and the door frame and threshold 3105 is left on the tub.

When the tub and apron are formed separately, the tub is formed with only a portion of the door frame and the apron is formed with the other half of the door frame. Then the pieces of the tub and apron are fiberglassed together and the aluminum extrusion is added to reinforce the bond between the two parts. When the tub and apron are formed integrally as described in earlier embodiments described above, there is some risk of tearing. However, in using the method to form the mold as in FIGS. 31 and 32, a strong threshold can be formed. The apron can be then formed integrally or as a separate piece, but the threshold is solidly formed. With the entire door frame is formed along with the tub in this manner, the use of the aluminum extrusion as described above to make the door frame becomes optional.

The description of the present invention has been presented for purposes of illustration and description, and is not intended to be exhaustive or limited to the invention in the fowl disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. A method for making a walk-in bathtub door, comprising:
   (a) forming a tub door cap from an acrylic sheet, wherein the tub door cap has an outer shape defining a door for a walk-in tub;
   (b) forming a channel into a surface of the tub door cap along a peripheral area thereof;
   (c) forming a threshold portion configured so as to have a peripheral edge to mate with the channel in the tub door cap and to extend outwardly in a thickness direction from the tub door cap and fitting the peripheral edge into the channel in the tub door cap; and
   (d) adhering the tub door cap to the threshold portion of the door to form a walk-in tub door.

2. The method according to claim 1, further comprising adhering the tub door cap to the threshold portion of the door using putty adhesive.

3. The method according to claim 1, further comprising forming the acrylic sheet of cast acrylic.

4. The method according to claim 1, wherein step (a) further comprises:
   reinforcing the acrylic sheet by co-extruding the acrylic sheet with a thermoplastic;
   adding a reinforcing filler; and/or fiberglass.

5. The method according to claim 4, wherein the thermoplastic is acrylonitrile-butadiene-styrene.

6. The method according to claim 4, wherein the acrylic sheet is reinforced by a fiberglass spray.

7. The method according to claim 1, wherein step (a) further comprises:
   forming a tub door cap from a reinforced acrylic sheet by casting.

8. A walk-in bathtub door made according to the method of claim 1.

9. A walk-in bathtub assembly comprising a walk-in bathtub having an opening for receiving a bathtub door and a walk-in bathtub door attached to the walk-in bathtub via a hinge, wherein the bathtub door is formed according to claim 1.

10. The method according to claim 1, further comprising machining the channel into the surface of the tub door cap.

11. The method according to claim 1, further comprising routing the channel out of the surface of the tub door cap.

* * * * *